United States Patent
Fujihara et al.

(10) Patent No.: US 7,633,602 B2
(45) Date of Patent: Dec. 15, 2009

(54) MEASUREMENT APPARATUS AND MEASUREMENT METHOD

(75) Inventors: Katsumi Fujihara, Kanagawa (JP); Hidetoshi Ohba, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 274 days.

(21) Appl. No.: 11/790,953

(22) Filed: Apr. 30, 2007

(65) Prior Publication Data
US 2008/0074651 A1 Mar. 27, 2008

(30) Foreign Application Priority Data
Sep. 27, 2006 (JP) ............................ 2006-262970

(51) Int. Cl.
G01P 3/36 (2006.01)
G01C 1/00 (2006.01)
(52) U.S. Cl. ................ 356/28; 356/152.2; 356/614
(58) Field of Classification Search ................ 356/28, 356/152.2, 614, 620, 139.1
See application file for complete search history.

(56) References Cited

U.S. PATENT DOCUMENTS

| | | | |
|---|---|---|---|
| 5,015,866 A * | 5/1991 | Hayashi | 250/548 |
| 5,151,749 A * | 9/1992 | Tanimoto et al. | 356/620 |
| 7,305,188 B2 | 12/2007 | Yamashita et al. | |
| 2003/0174382 A1* | 9/2003 | Massieu | 359/290 |
| 2005/0200984 A1* | 9/2005 | Browne et al. | 359/846 |
| 2005/0213978 A1 | 9/2005 | Yamashita et al. | |

FOREIGN PATENT DOCUMENTS

| | | |
|---|---|---|
| JP | 06-147987 A | 5/1994 |
| JP | 7-55704 A | 3/1995 |
| JP | 7-55716 A | 3/1995 |
| JP | 2002-005853 A | 1/2002 |
| JP | 2005-003389 A | 1/2005 |
| JP | 2005-283932 A | 10/2005 |
| KR | 10-0159136 B1 | 3/1995 |

OTHER PUBLICATIONS

Korean Office Action dated Apr. 30, 2008, issued in corresponding Korean Patent Application No. 10-2007-0051431 with English translation.

* cited by examiner

*Primary Examiner*—Isam Alsomiri
(74) *Attorney, Agent, or Firm*—Westerman, Hattori, Daniels & Adrian, LLP

(57) ABSTRACT

A measurement apparatus having a measurement light source for emitting measurement light, a projection unit on which reflected light formed when the measurement light is reflected from the mirror plane is projected as a projected light spot, an image pickup unit for picking up an image of the projection unit on which the reflected light is projected as the projected light spot, a control unit for controlling an inclination of the mirror plane and a measurement unit for measuring a quantity of movement of the projected light spot, which moves according to a change of the inclination of the mirror plane, on the basis of the image of the projection unit. This enables the measurement of a deflection characteristic of a mirror system having the mirror plane variable to arrange the inclination within a short period of time and with high accuracy.

19 Claims, 18 Drawing Sheets

MEASUREMENT APPARATUS AND MEASUREMENT METHOD

BACKGROUND OF THE INVENTION

1) Field of the Invention

The present invention relates to a measurement method of measuring a characteristic of a mirror system having a mirror plane variable to arrange an inclination, and more particularly to a technique suitable for use in measurements of a deflection characteristic of a mirror system based on reflected light from a mirror plane.

2) Description of the Related Art

In recent years, for example, in communication fields using optical fibers, an optical switch which enables a path of an optical signal to be switched in a state of light has been employed in a case in which an optical signal is switched form one optical fiber network, in which it currently flows, to a different optical fiber network, or in other cases. As this optical switch, there has commonly been used a mirror system which includes a mirror made to change a propagation direction of an optical signal by reflecting the optical signal and controls a deflection angle (inclination) of a mirror plane (surface) of this mirror to realize the three-dimensional switching of an optical signal. In addition to the optical switch, this mirror system has also been employed for an apparatus in which mirrors are disposed in the form of an array so as to use the mirror array for the scanning by incident light.

As the mirror systems, for example, there have been known an MEMS (Micro Electro Mechanical Systems) mirror designed to control a deflection angle of a mirror plane by use of an electrostatic force as shown in FIG. 5 of the following Patent Document 1 and a galvanomirror in which a mirror plane is mounted on a shaft of a motor so that the deflection angle of the mirror plane mounted on the motor shaft is controlled by driving the motor by use of an electromagnetic force.

FIG. 16 illustratively shows an example of an arrangement of an MEMS mirror. For example, as shown in FIG. 16, the MEMS (Micro Electro Mechanical Systems) mirror, generally designated at reference numeral 70, is made up of a mirror plane 71, an inner frame 72, an outer frame 73, first torsion bar springs 74, 74 and second torsion bar springs 75, 75. The first torsion bar springs 74 and 74 are disposed along an X-axis direction so as to perpendicularly intersect a pair of sides of the rectangular mirror plane 71, confronting each other, at central positions of the pair of sides thereof, respectively. Moreover, in the MEMS mirror 70, the second torsion bar springs 75 and 75 are disposed along a Y-axis direction perpendicular to the X-axis direction so as to perpendicularly intersect a pair of sides of the rectangular inner frame 72, confronting each other, at central positions of the pair of sides thereof, respectively. Still moreover, the mirror plane 71 is attached through the first torsion bar springs 74 and 74 to the inner frame 72 so as to be rotatable around the X axis, while the inner frame 72, together with the mirror plane 71, is attached through the second torsion bar springs 75 and 75 to the outer frame 73 so as to be rotatable around the Y axis.

In addition, the MEMS mirror 70 includes a drive circuit (not shown) which generates an electrostatic force in response to the input of a voltage, and the deflection angle of the mirror plane 71 is changeable without restriction by means of tortional functions of the first torsion bar springs 74, 74 or the second torsion bar springs 75, 75 which correspond to this electrostatic force.

The mirror system such as the above-mentioned MEMS mirror 70 is designed such that its deflection angle is controlled by receiving an input of a voltage, and an individual difference can occur among deflection characteristics (maximum deflection angles, deflection angles when a predetermined voltage is inputted, deflection velocities and resonance points when an inputted voltage is changed by a predetermined oscillation frequency, and others). For example, even when the same voltages are inputted to a plurality of mirror systems having the same arrangements, a difference may arise in deflection angle or resonance point and in deflection velocity relative to the inputted voltage and, hence, there is a need to prepare a processing at the time of manufacturing to measure a deflection characteristic of the mirror system for, on the basis of the measurement result, correcting a voltage set value which can operate the mirror system.

In general, the measurement of the deflection characteristic of the mirror system is made on the basis of reflected light reflected from a mirror plane (which will hereinafter be referred to simply as reflected light) and, as conventional techniques, there have been known a method (PSD method) of measuring the intensity and position of reflected light by using a PSD (Position Sensitive Device) element, a method (laser Doppler oscillation-system method) of measuring the interference of reflected light by using a laser Doppler oscillation system, and other methods.

FIGS. 17 and 18 are illustrative views showing examples of arrangements of conventional measurement apparatuses. For example, as shown in FIG. 17, a measurement apparatus 80 based on the PSD method is composed of a measurement light source 82 made to emit measurement light 81 onto a mirror plane 71 and a PSD element 84 made to receive reflected light 83 produced by the reflection of the measurement light 81, emitted from the measurement light source 82, on the mirror plane 71. When the PSD element 84 receives the reflected light 83, the measurement result including the intensity of the reflected light 83 and the incidence position on the PSD element is outputted as a voltage (analog signal) to evaluation equipment (not shown) such as a computer. Moreover, the evaluation on the deflection characteristic of the mirror system is made on the basis of the inputted voltage (voltage value, oscillation frequency, or the like) inputted to the mirror system and the measurement result of the reflected light on the PSD element 84.

[Patent Document 1]

Japanese Patent Laid-Open No. 2005-283932

Meanwhile, for example, for the measurement of a mirror system at the manufacturing, there is a case in which the characteristic correction is dynamically made using a result of the measurement and, in this case, there is a need to accurately measure the deflection characteristic of the mirror system within a short period of time.

There is a problem which arises with the above-mentioned PSD method, however, in that, since the PSD element 84 is designed to output the positional information on the reflected light 83 as an analog signal, the reliability (stability) of the positional information suffers degradation, thereby making it difficult to accomplish the measurement with high accuracy. In addition, in a case in which, for example, as shown in FIG. 18, a protection cover glass 85 is located outside the mirror system 70, the PSD element 84 can receive not only the reflected light 83 from the mirror plane 71 but also the reflected lights 86a, 86b and 86c from a front surface 85a and rear surface 85b of the cover glass 85. In the case of the PSD element 84, difficulty is encountered in achieving the accurate measurement in such a case of the simultaneous reception of a plurality of inputted lights.

Moreover, in a case in which the reflected light 83 moves at a high speed due to high-speed oscillation (deflection) of the mirror plane 71, difficulty is experienced in accurately reading out the movement quantity of the reflected light 83 due to the restriction on the response performance of the PSD element 84.

Furthermore, in the case of the employment of the laser Doppler oscillation-system method, there is a need to measure the interference between the reflected light 83 and the light appearing due to the reflection of the reflected light 83, which encounters complicated condition setting such as location of a measurement apparatus and suffers an increase in cost of the measurement apparatus.

SUMMARY OF THE INVENTION

The present invention has been developed in consideration of these problems, and it is therefore an object of the invention to measure the deflection characteristic of a mirror system having a mirror plane variable to arrange an inclination within a short period of time and with high accuracy.

For this purpose, in accordance with the present invention, there is provided a measurement apparatus made to measure a characteristic of a mirror system having a mirror plane variable to arrange an inclination, comprising a measurement light source for emitting measurement light onto the mirror plane, a projection unit on which reflected light formed when the measurement light emitted from the measurement light source is reflected from the mirror plane is projected as a projected light spot, an image pickup unit for picking up an image of the projection unit on which the reflected light is projected as the projected light spot, a control unit for controlling the inclination of the mirror plane, and a measurement unit for measuring a quantity of movement of the projected light spot, which moves according to a change of the inclination of the mirror plane controlled by the control unit, on the basis of the image of the projection unit picked up by the image pickup unit.

In this case, it is also appropriate that the image pickup unit first picks up, as a first image, an image of the projected light spot before a change of the inclination of the mirror plane by the control unit and then picks up, as a second image, an image of the projected light spot after the change of the inclination of the mirror plane by the control unit, and the measurement unit measures the quantity of movement of the projected light spot on the basis of the first and second images picked up by the image pickup unit.

Preferably, the image pickup unit picks up an image of a trajectory of the projected light spot while the inclination of the mirror plane is changed by the control unit and the measurement unit measures the quantity of movement of the projected light spot on the basis of the image of the trajectory picked up by the image pickup unit.

In addition, preferably, the measurement apparatus further comprises an extraction unit for extracting the projected light spot, which is an object of measurement, from a plurality of light spots projected on the projection unit on the basis of the image picked up by said image pickup unit.

Still additionally, it is also appropriate that the extraction unit extracts the projected light spot, which is the object of measurement, on the basis of intensities of the light spots.

Yet additionally, it is also acceptable that the extraction unit extracts the projected light spot, which is an object of measurement, on the basis of the sizes of the light spots, or that the extraction unit extracts the projected light spot, which is an object of measurement, on the basis of the arrangement positions of the light spots.

Moreover, it is also appropriate that the extraction unit extracts the projected light spot, which is an object of measurement, on the basis of a difference in coordinate value between the light spots before and after the change of the inclination of the mirror plane by the control unit.

Still moreover, it is also appropriate that the mirror system includes a plurality of rotary shafts so that the mirror plane is rotatable around each of the plurality of rotary shafts and, when a plurality of light spots projected on the projection unit are displayed in a state arranged on one line in the projection unit, the control unit rotates one rotary shaft in the mirror system so as to make a deflection angle of the mirror plane so that the projected light spot which is the object of measurement and the light spot other than the object of measurement are displayed on different lines and then controls the deflection angle of the mirror plane by rotating the other rotary shaft in the mirror system.

Furthermore, in accordance with the present invention, there is provided a measurement method of measuring a characteristic of a mirror system having a mirror plane variable to arrange an inclination, comprising an emission step of emitting measurement light onto the mirror plane, a projection step in which reflected light formed when the measurement light emitted in the emission step is reflected from the mirror plane is projected as a projected light spot onto a projection unit, an image pickup step of picking up an image of the projection unit on which the reflected light is projected as the projected light spot in the projection step, a control step of controlling the inclination of the mirror plane, and a measurement step of measuring a quantity of movement of the projected light spot, which moves according to a change of the inclination of the mirror plane controlled in the control step, on the basis of the image of the projection unit picked up in the image pickup step.

In this case, it is also appropriate that, in the image pickup step, an image of the projected light spot before a change of the inclination of the mirror plane in the control step is first picked up as a first image and an image of the projected light spot after the change of the inclination of the mirror plane in the control step is then picked up as a second image and, in the measurement step, the quantity of movement of the projected light spot is measured on the basis of the first and second images picked up in the image pickup step.

Preferably, in the image pickup step, an image of a trajectory of the projected light spot is picked up while the inclination of the mirror plane is changed in the control step and, in the measurement step, the quantity of movement of the projected light spot is measured on the basis of the trajectory picked up in the image pickup step.

In addition, preferably, the measurement method further comprises an extraction step of extracting the projected light spot, which is an object of measurement, from a plurality of light spots projected on the projection unit in the projection step on the basis of the image picked up in the image pickup step.

Still additionally, it is also appropriate that, in the extraction step, the projected light spot which is the object of measurement is extracted on the basis of intensities of the light spots.

Yet additionally, it is also acceptable that, in the extraction step, the projected light spot which is an object of measurement is extracted on the basis of the sizes of the light spots, or that, in the extraction step, the projected light spot which is an object of measurement is extracted on the basis of the arrangement positions of the light spots.

Moreover, it is also appropriate that, in the extraction step, the projected light spot which is an object of measurement is extracted on the basis of a difference in coordinate value between the light spots before and after the change of the inclination of the mirror plane in the control step.

Still moreover, it is also appropriate that the mirror system includes a plurality of rotary shafts so that the mirror plane is rotatable around each of the plurality of rotary shafts and, in the control step, when a plurality of light spots projected in the projection step are displayed in a state arranged on one line in the projection unit, one rotary shaft in the mirror system is rotated so as to make a deflection angle of the mirror plane so that the projected light spot which is the object of measurement and the light spot other than the object of measurement are displayed on different lines and the deflection angle of the mirror plane is then controlled by rotating the other rotary shaft in the mirror system.

In addition, in accordance with the present invention, there is provided a mirror system manufacturing method of manufacturing a mirror system having a mirror plane variable to arrange an inclination, comprising a manufacturing step of manufacturing the mirror system and an inspection step of inspecting the mirror system manufactured in the manufacturing step, wherein the inspection step includes an emission step of emitting measurement light onto the mirror plane, a projection step in which reflected light formed when the measurement light emitted in the emission step is reflected from the mirror plane is projected as a projected light spot onto a projection unit, an image pickup step of picking up an image of the projection unit on which the reflected light is projected as the projected light spot in the projection step, a control step of controlling the inclination of the mirror plane, and a measurement step of measuring a quantity of movement of the projected light spot, which moves according to a change of the inclination of the mirror plane controlled in the control step, on the basis of the image of the projection unit picked up in the image pickup step.

According to the present invention, the reflected light formed when measurement light is reflected on a mirror plane is projected as a projected light spot onto a projection unit so as to pick up an image of the projection unit on which the reflected light is projected as the projected light spot, which enables the two-dimensional measurement of a characteristic (maximum deflection angles, deflection angles when a predetermined voltage is inputted, deflection velocities and resonance points when an inputted voltage is changed by a predetermined oscillation frequency, and others) of the mirror system. Moreover, the measurement of a characteristic of the mirror system is feasible only by picking up an image of the projection unit on which the reflected light is projected as the projected light spot, which enables the measurement within a short period of time without setting complicated conditions such as the disposition of the measurement apparatus. Therefore, the characteristic of the mirror system can be measured within a short period of time and with high accuracy.

Furthermore, it is possible to easily measure the characteristic of the mirror system by measuring a quantity (distance) of movement of a projected light spot which moves according to a change of the inclination of the mirror plane under control.

Still furthermore, an image of the projected light spot before the change of the inclination of the mirror plane is picked up as a first image and an image of the projected light spot after the change of the inclination of the mirror plane is picked up as a second image, thereby enabling easy measurement of the characteristic of the mirror system involved in the inclining movement of the mirror plane.

Yet furthermore, an image of a locus of a projected light spot is picked up in process of the change of the inclination of the mirror plane so that the quantity of movement of the projected light spot is measured on the basis of the locus image-picked up, which enables the accurate measurement of the quantity of movement of the projected light spot even in a case in which the projected light spot moves at a high speed according to the high-speed inclination oscillation of the mirror plane in the mirror system and which eliminates the need for the complicated adjustments, such as making the synchronization with the oscillation frequency for the proper delay. Therefore, it is possible to achieve the easy and accurate measurement of a quantity of movement of a projected light spot corresponding to a deflection angle irrespective of the deflection speed and oscillation frequency of the mirror plane.

Moreover, even in a case in which, combined with the reflected light which is an object of measurement, unnecessary light other than the object of measurement appears from a cover glass and others and is projected as a light spot onto the projection unit, since the projected light spot which is the object of measurement can be extracted from a plurality of projected light spots on the basis of the image of the projection unit picked up, the characteristic of the mirror system can be measured with higher accuracy.

Still moreover, when the projected light spot which is the object of measurement is extracted on the basis of the intensities of the projected light spots, it is possible to accurately specify the projected light spot which is the object of measurement.

Yet moreover, for example, in a case in which the unnecessary light other than the object of measurement from a cover glass or the like is projected as a light spot so that a plurality of light spots are displayed in a state arranged on the same line in a projection plane, as the control of the deflection angle of the mirror plane, the mirror plane is rotated so as to stand at a deflection angle so that the projected light spot which is the object of measurement and the light spots other than the object of measurement are displayed on different lines, thereby enabling the measurement in a state where the projected light spot which is the object of measurement and the light spots other than the object of measurement are separated from each other.

DESCRIPTION OF THE PREFERRED EMBODIMENTS

Embodiments of the present invention will be described hereinbelow with reference to the drawings.

[1] Description of an Embodiment of the Present Invention

Figure 1:
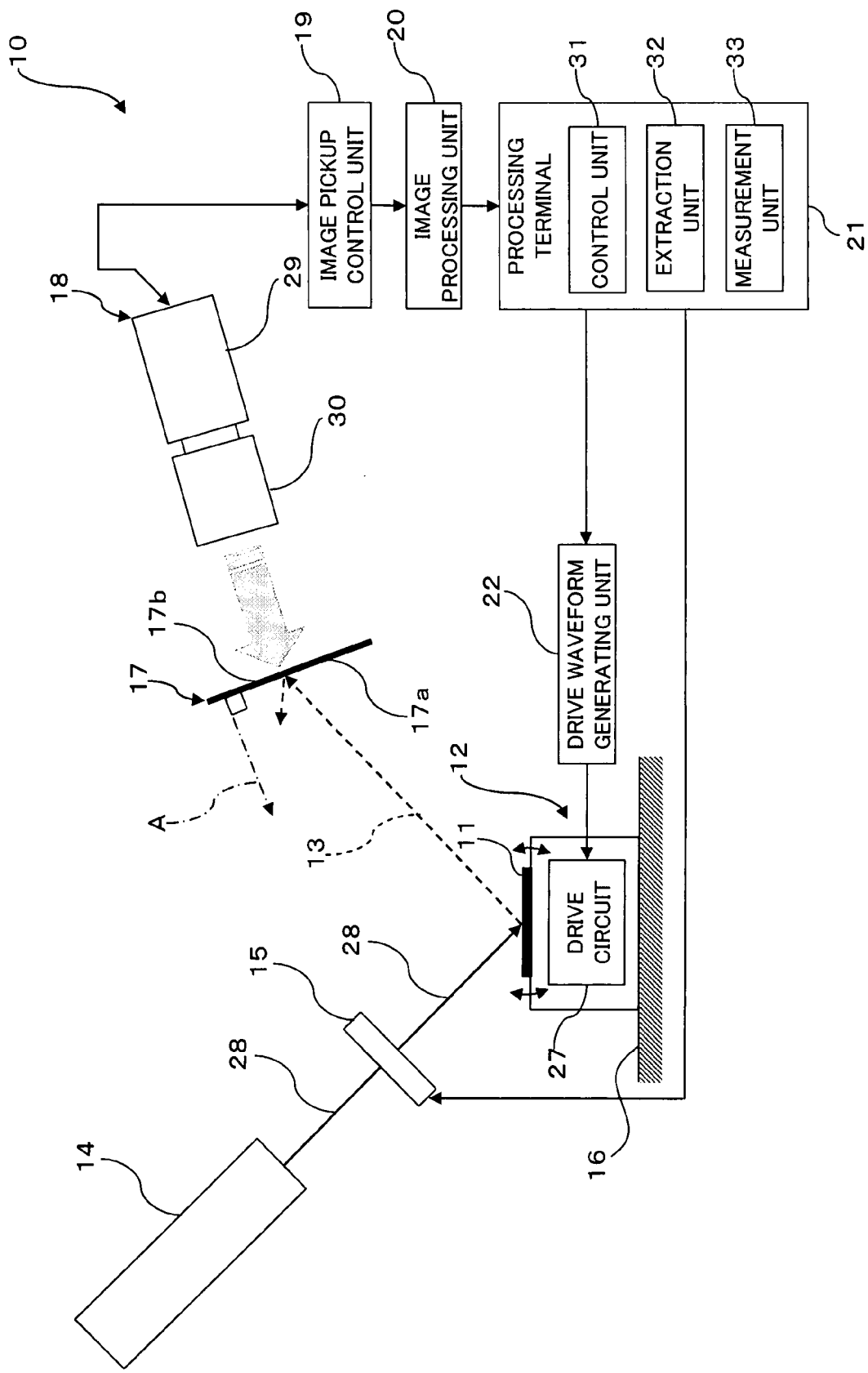
FIG. 1 is an illustrative view showing an example of a configuration of a measurement apparatus according to an embodiment of the present invention.
Figure 2:
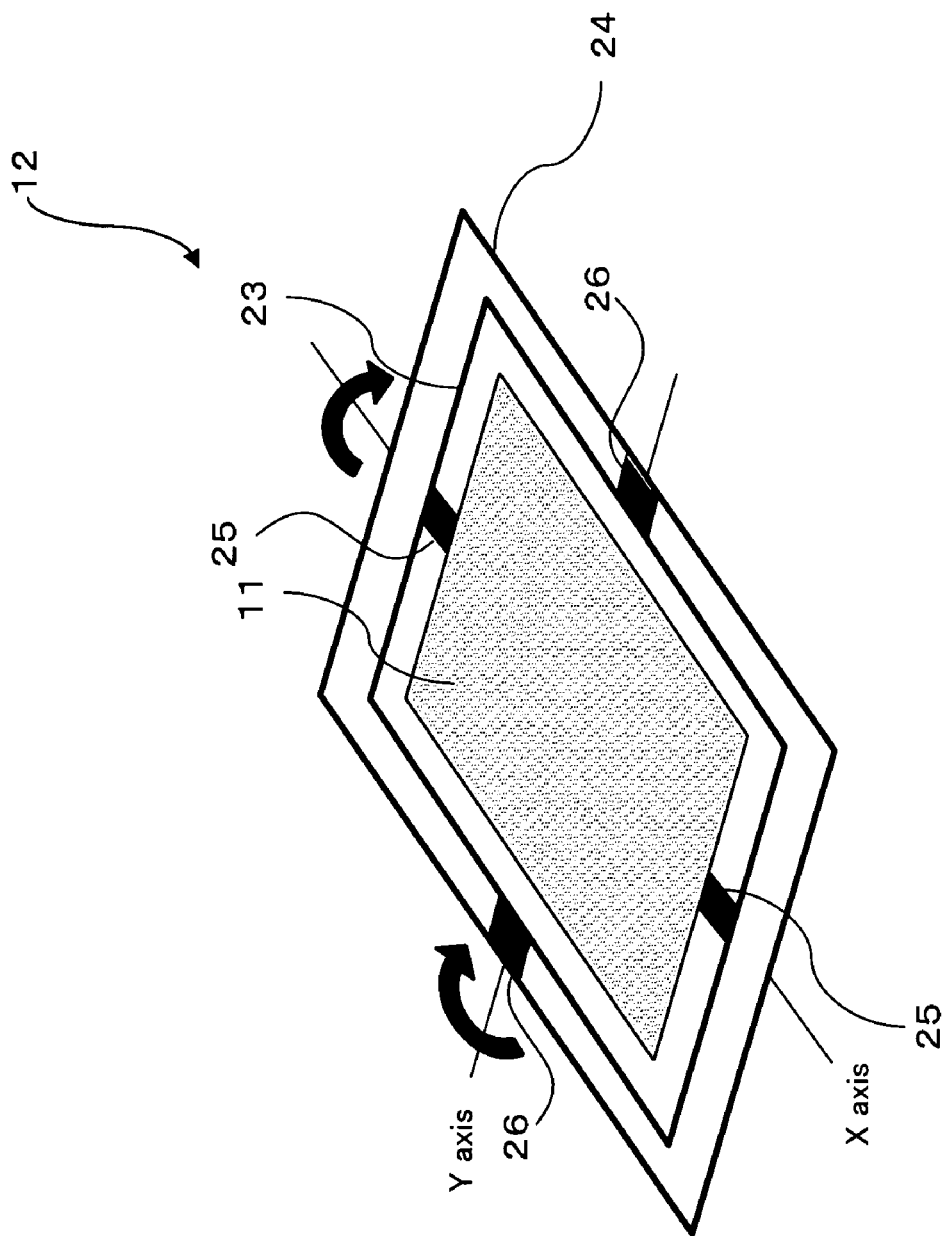
FIG. 2 is an illustrative view showing an example of a configuration of an MEMS mirror which is an object of measurement by a measurement apparatus according to an embodiment of the present invention.
Figure 3:
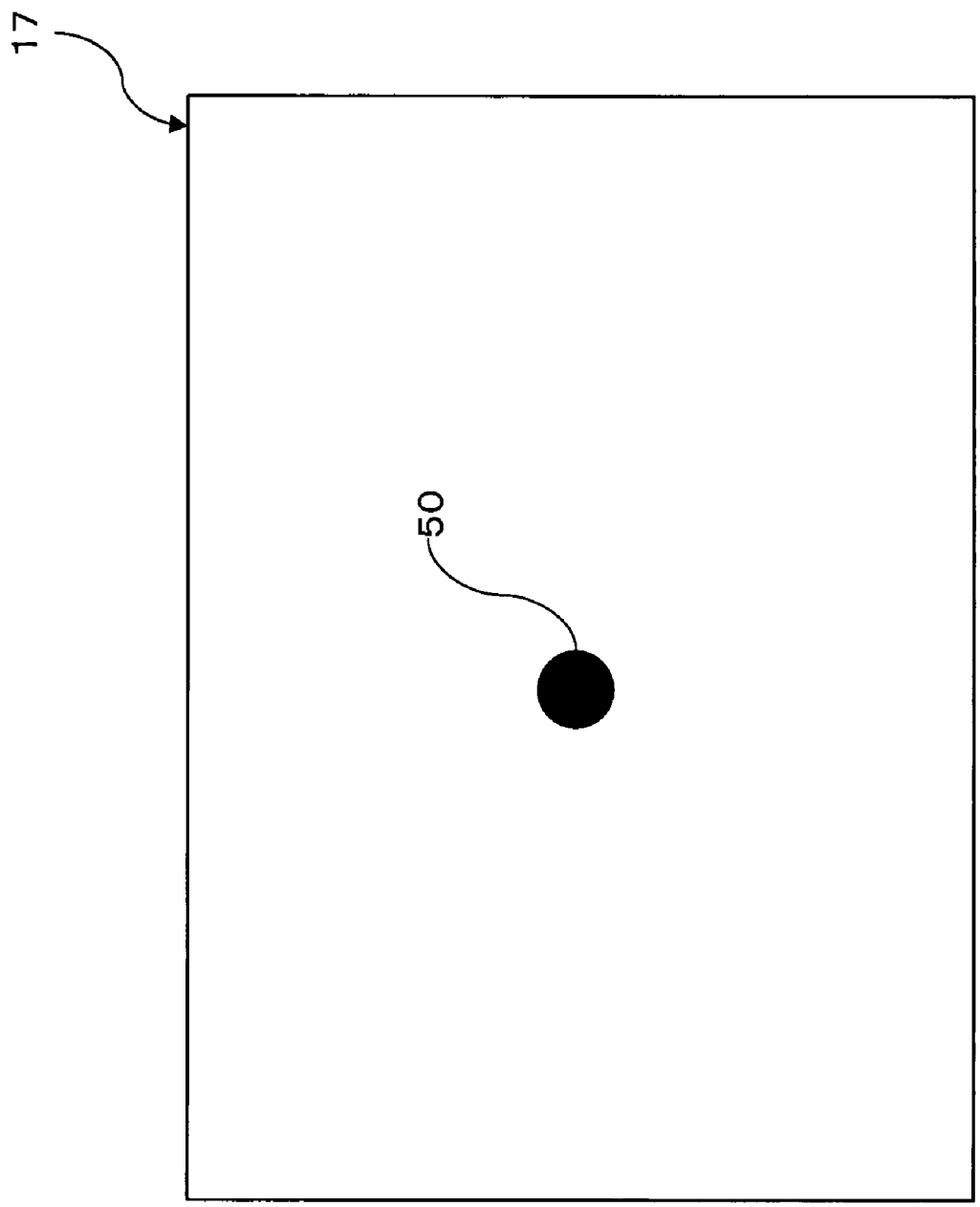
FIG. 3 is an illustration of an example of an image picked up by an image pickup unit of a measurement apparatus according to an embodiment of the present invention.

FIG. 1 is an illustrative view showing an example of a configuration of a measurement apparatus according to an embodiment of the present invention, FIG. 2 is a perspective view illustratively showing an example of a configuration of an MEMS (Micro Electro Mechanical Systems) mirror which is an object of measurement by the measurement apparatus, and FIG. 3 is an illustration of an example of an image picked up (captured) by an image pickup unit thereof.

A measurement apparatus 10 according to this embodiment is a device for measuring deflection characteristics (maximum deflection angles, deflection angles when a predetermined voltage is inputted, deflection velocities and resonance points when an inputted voltage is changed by a predetermined oscillation frequency, and others) of an MEMS (Micro Electro Mechanical Systems) mirror (mirror system) 12 whose mirror plane 11 is variable in deflection angle (inclination) and, as shown in FIG. 1, it is made up of a measurement light source 14, a measurement light control unit 15, a stage 16, a projection screen (projection unit) 17, an image pickup unit 18, an image pickup control unit 19, an image processing unit 20, a processing terminal 21 and a drive waveform generating unit 22.

In this configuration, the MEMS mirror (deflection mirror under measurement) 12 is for use in, for example, an optical switch which realizes the three-dimensional switching of an optical signal by controlling a deflection angle (inclination) of a mirror plane (surface) 11. For example, as shown in FIG. 2, the MEMS mirror 12 is composed of the mirror plane 11, an inner frame 23, an outer frame 24, first torsion bar springs (rotary shafts) 25, 25 and second torsion bar springs (rotary shafts) 26, 26. The first torsion bar springs 25 and 25 are disposed along an X-axis direction so as to perpendicularly intersect a pair of sides of the rectangular mirror plane 11, confronting each other, at central positions of the pair of sides thereof, respectively. Moreover, in the MEMS mirror 12, the second torsion bar springs 26 and 26 are disposed along a Y-axis direction perpendicular to the X-axis direction so as to perpendicularly intersect a pair of sides of the rectangular inner frame 23, confronting each other, at central positions of the pair of sides thereof, respectively. Still moreover, the mirror plane 11 is attached through the first torsion bar springs 25 and 25 to the inner frame 23 so as to be rotatable around the X axis, while the inner frame 23, together with the mirror plane 11, is attached through the second torsion bar springs 26 and 26 to the outer frame 24 so as to be rotatable around the Y axis.

In addition, the MEMS mirror 12 is equipped with a drive circuit 27 (see FIG. 1) made to generate an electrostatic force in response to an input of a voltage thereto, and the deflection angle of the mirror plane 11 is changeable without restriction by means of the torsional actions of the first torsion bar springs 25, 25 or the second torsion bar springs 26, 26 corresponding to the generated electrostatic force.

In the following description, the MEMS mirror 12 whose mirror plane 11 is rotatable in two axial directions of the X-axis direction and the Y-axis direction as shown in FIG. 2 will sometimes be referred to as an MEMS mirror 12 having two axes.

Moreover, in the following description, the first torsion bar springs 25, 25 and the second torsion bar springs 26, 26 will sometimes be referred to simply as torsion bar springs for convenience only. Still moreover, this MEMS mirror 12 is also applicable to not only the above-mentioned optical switch but also an apparatus in which mirrors are disposed in the form of an array so as to conduct the scanning by incident light through the use of the mirror array.

The measurement light source 14 is for emitting laser light (measurement light) 28 onto the mirror plane 11 and is realizable using various types of existing techniques designed to output the laser light 28 onto the mirror plane 11.

The measurement light control unit 15 is for controlling the laser light 28 outputted from the measurement light source 14 and, for example, it is equipped with a shutter (light interception device; not shown) made to be capable of arbitrarily cutting the laser light 28 through the opening and closing operations thereof and a light quantity adjuster (adjusting lens; not shown) made to be capable of adjusting the intensity and size (light diameter) of the laser light 28. Moreover, in this embodiment, the opening and closing operations of the shutter are conducted according to a signal inputted thereto from a control unit 31 which will be mentioned later.

The stage 16 is for supporting the MEMS mirror 12, which is an object of measurement, put thereon.

The projection screen 17 is for receiving, as a projected light spot 50, the projection (emission) of the reflected light 13 formed when the laser light 28 emitted from the measurement light source 14 is reflected on the mirror plane 11 and, as shown in FIG. 3, it is made to display (image formation) the reflected light 13 from the mirror plane 11 as the projected light spot 50 (point image). This projection screen 17 is realized with a diffusion plate which allows the transmission of a portion of the reflected light 13 from the mirror plane 11 and, concretely, it is made using a member with light permeability which allows the transmission of a portion of light, and each of a projection surface 17a on which the reflected light 13 is projected and a rear surface 17b (surface opposite to the projection surface 17a) is formed into an irregular (concavity and convexity) configuration, thereby diffusing the reflected light 13 incident thereon.

Moreover, this projection screen 17 is disposed so that the reflected light 13 is incident at an angle of incidence other than 90° with respect to the projection surface 17a. That is, the projection screen 17 is disposed so that a normal direction A of the projection surface 17a is not in parallel with the reflection light 13, and the reflected light of the reflected light 13 incident on the projection surface 17a and reflected on the projection surface 17a does not overlap with the reflected light 13. In other words, in this measurement apparatus 10, the projection screen 17 is placed to slant with respect to the reflected light 13, which excludes the unnecessary light reflected from the projection screen 17. This signifies that the optical axis of the image pickup system including the projection screen 17 and devices subsequent thereto is inclined in order to eliminate the unnecessary light reflection.

The image pickup unit 18 is for picking up an image of the projection screen 17 on which the reflected light 13 is projected as the projected light spot 50 shown in FIG. 3, and it is composed of an image acquiring unit 29 and an image pickup lens 30.

The image acquiring unit 29 picks up an image of the projection screen 17, on which the reflected light 13 is projected as the projected light spot 50, so as to acquire an image (see FIG. 3) of the projection screen 17 and, for example, it is realizable with a camera apparatus (TV camera or the like) having an image pickup element (imaging element; sensor) such as a CCD (Charge Coupled Device) or a CMOS (Complementary Metal Oxide Semiconductor) sensor.

Moreover, this image acquiring unit 29 has, for example, a shutter speed changing function capable of arbitrarily setting the time (image pickup storage time) for which the imaging element accepts light and a multiple exposure function capable of making the exposure in a state where a plurality of images are put on one image in a combined fashion. In this embodiment, the image acquiring unit 29 is designed to output the acquired image as image data to the image pickup control unit 19 which will be mentioned later.

The image pickup lens 30 is for bringing the projection screen 17 (rear surface 17b) into a focus by changing the focal length freely in a given range and for making the image acquiring unit 29 pick up an image of the projection screen 17 at an arbitrary magnification. For example, it is realizable with a zoom lens.

Moreover, in the example shown in FIG. 1, the image pickup unit 18 is disposed on the rear surface 17b side of the projection screen 17 to pick up an image of the rear surface 17b of the projection screen 17, and it is made to be capable of arbitrarily setting the distance between the image pickup unit 18 and the projection screen 17 on the basis of the magnification of the image pickup lens 30 or the like.

That is, in this measurement apparatus 10, the light (reflected light 13) reflected from the MEMS mirror 12 (mirror plane 11) is once projected on the projection screen 17, and the image pickup unit 18 uses the image acquiring unit 29 to make the image acquiring unit 29 pick up an image of the rear surface 17b of this projection screen 17 to capture a variation of the deflected light (reflected light 13) as an image.

The image pickup control unit 19 is designed as a control circuit to control the image pickup unit 18 for capturing an image acquired by the image acquiring unit 29, and it is made to not only quantize the image data inputted from the image acquiring unit 29 but also output a control signal to, for example, the image acquiring unit 29 and the image pickup lens 30 for giving an image pickup instruction to the image acquiring unit 29, for changing the shutter speed of the image acquiring unit 29 and for adjusting the magnification of the image pickup lens 30. In this embodiment, the quantized image quantized by the image pickup control unit 19 is outputted to the image processing unit 20 which will be mentioned later.

The image processing unit 20 is configured as an image processing circuit to process the quantized image inputted from the image pickup control unit 19 and, for example, it is made to remove noises in the quantized image and further to output the processed image to the processing terminal 21 which will be mentioned below.

The processing terminal 21 is configured as a computer having functions as a control unit 31, an extraction unit 32 and a measurement unit 33.

Furthermore, this processing terminal 21 includes, in addition to the above-mentioned CPU, for example, a display (not shown) for displaying various types of information related to processing terminals and an inputting device (keyboard, a mouse and others; not shown) for inputting data, instruction contents and others to the processing terminal 21 through various types of inputs and operations by an inspector.

The control unit 31 is for controlling a deflection angle of the mirror plane 11, and it is designed to, for example, when the aforesaid inspector inputs drive conditions (value of an inputted voltage, oscillation frequency of the inputted voltage, and others) for changing the deflection angle of the mirror plane 11 through the inputting device, output a control signal, which corresponds to the drive conditions inputted thereto, to the drive waveform generating unit 22. Moreover, this control unit 31 is made to execute the control on the opening/closing operations of the shutter by the measurement light control unit 15 and, for example, when the inspector inputs an instruction for the start of the measurement through the inputting device, it conducts the shutter opening operation while, when the inspector inputs an instruction for the end of the measurement, it conducts the shutter closing operation.

The extraction unit 32 is for extracting a projected light spot, which is an object of measurement, from a plurality of light spots projected on the projection screen 17 on the basis of the processed image outputted from the image processing unit 20. A concrete extraction technique will be mentioned later.

The measurement unit 33 is for measuring a deflection characteristic of the MEMS mirror 12 on the basis of an image (processed image) on the projection screen 17 which has been picked up by the image pickup unit 18, and it is made to measure an intensity (brightness), size (dimension) and coordinate value (position) of a projected light spot 50 which is an object of measurement for measuring a deflection characteristic(s) (maximum deflection angle, deflection angle when a predetermined voltage is inputted, deflection velocity and resonance point when an inputted voltage is changed by a predetermined oscillation frequency, and others).

Moreover, the inspector evaluates the deflection characteristic of the MEMS mirror 12 on the basis of the inputted measurement conditions (value of the inputted voltage, oscillation frequency of the inputted voltage, and others) and a result of the measurement by the measurement unit 33.

The above-mentioned functions as the control unit 31, the extraction unit 32 and the measurement unit 33 are realizable by a CPU (Central Processing Unit; not shown). It is also appropriate that the respective functions as the control unit 31, the extraction unit 32 and the measurement unit 33 are realized in a manner such that a computer (including a CPU, an information processing apparatus and various types of terminals) executes a predetermined application program.

This program is offered in a state recorded in a computer-readable recording medium such as a flexible disk, CD (CD-ROM, CD-R, CD-RW or the like) or DVD (DVD-ROM, DVD-RAM, DVD-R, DVD-RW, DVD+R, DVD+RW, or the like). In this case, for the use of this program, the computer reads out the program from that recording medium and transfers it to an internal storage unit or external storage unit for storing it. It is also acceptable that this program is first recorded in a storage unit (recording medium) such as a magnetic disk, optical disk or magneto optical disk and then offered from that storage unit through a communication line to the computer.

In this case, the computer is a concept including a hardware and an OS, and signifies the hardware operating under control of the OS. Moreover, if the OS is unnecessary and an application program operates the hardware by itself, the hardware itself corresponds to the computer. The hardware has at least a microprocessor, such as a CPU, and a means for reading out a computer program recorded in a recording medium.

The application program serving as the above-mentioned program contains a program code for making a computer, such as the above-mentioned computer, realize the functions as the control unit 31, the extraction unit 32 and the measurement unit 33. Moreover, a portion of these functions can also be realized by the OS instead of the application program.

In addition, combined with the above-mentioned flexible disk, CD, DVD, magnetic disk, optical disk and magneto optical disk, the recording medium in this embodiment can include an IC card, a ROM cartridge, a magnetic tape, a punch card, an internal storage unit (memory such as RAM or ROM) of a computer, an external storage unit and others, and it can further include various types of mediums, readable by a computer, such as printed matters having a printed code (bar-code or the like).

The drive waveform generating unit 22 is configured as a waveform generating circuit made to generate a control signal (drive signal) with a drive waveform based on the drive conditions inputted from the control unit 31, and when the generated drive signal is outputted to the drive circuit 27 of the MEMS mirror 12, this drive circuit 27 inclines the mirror plane 11 to make a predetermined angle, or vibrates it, through the torsion bar springs 25, 25, 26 and 26 in accordance with the drive conditions.

Figure 4:
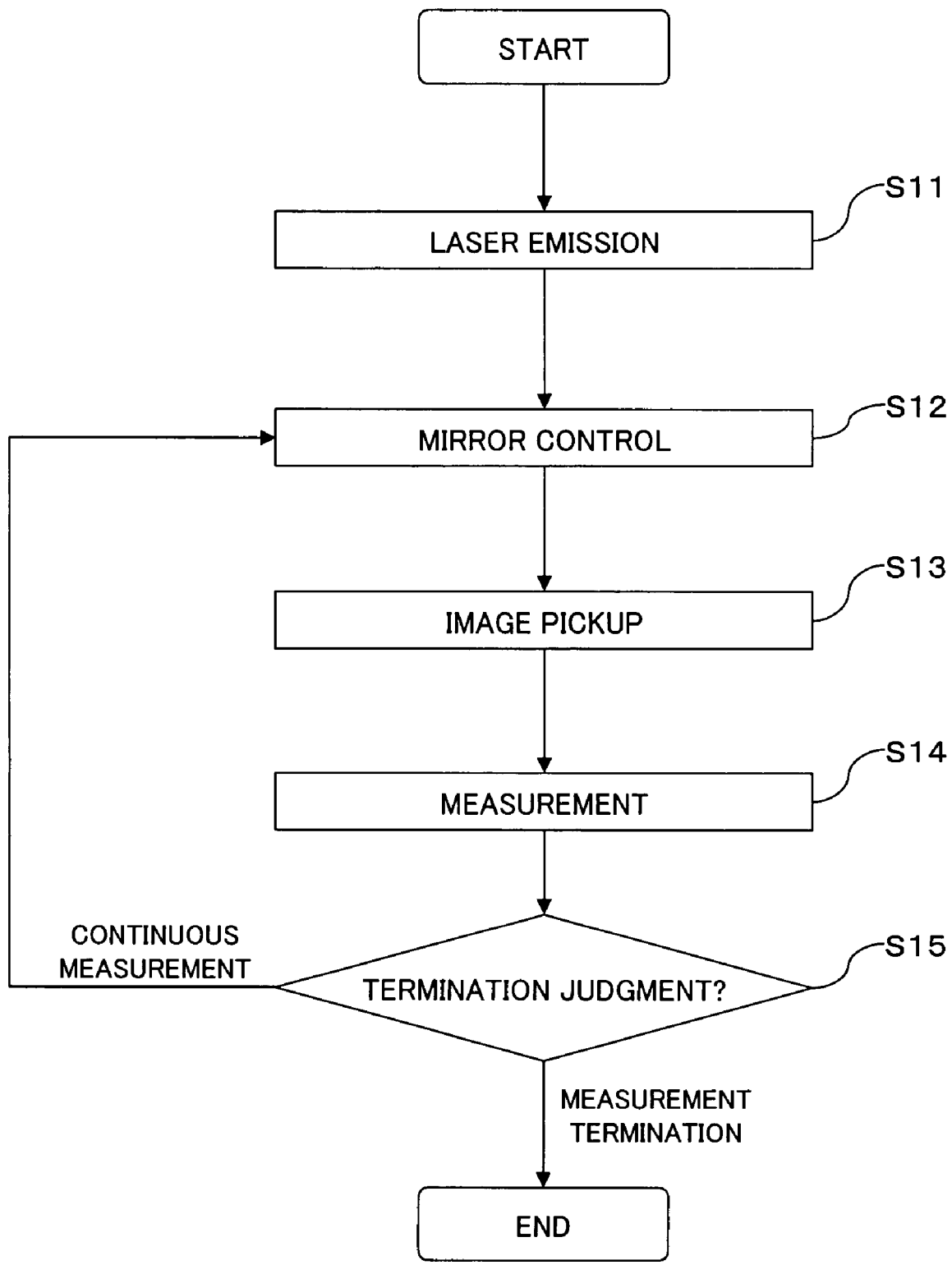
FIG. 4 is a flow chart showing one example of a measurement procedure in a measurement apparatus according to an embodiment of the present invention.

Referring to a flow chart (steps S11 to S15) of FIG. 4, a description will be given hereinbelow of one example of a measurement procedure in the measurement apparatus 10 thus configured according to the embodiment of the present invention.

First of all, an inspector puts the MEMS mirror 12 on the stage 16 and inputs an instruction for the start of measurement through the inputting device, and the measurement light control unit 15 conducts the shutter opening operation, and the measurement light source 14 emits the laser light 28 onto the mirror plane 11 (step S11; emission step).

The laser light 28 emitted from the measurement light source 14 is reflected on the mirror plane 11 to form the reflected light 13 which in turn, is projected onto the projection screen 17. In the projection screen 17 on which the reflected light 13 is projected, the reflected light 13 is displayed as the projected light spot 50 on the projection surface 17a and rear surface 17b (projection step).

Following this, the inspector inputs the drive conditions (value of an inputted voltage, oscillation frequency of the inputted voltage, and others) through the inputting device to the control unit 31, and the drive waveform generating unit 22 generates a drive signal based on the inputted drive conditions and outputs this drive signal to the drive circuit 27. In response to the input of the drive signal, on the basis of the drive signal, the drive circuit 27 inclines the mirror plane 11 to make a predetermined angle (step S12; control step).

In addition, the image acquiring unit 29 picks up an image of the rear surface 17b of the projection screen 17 to acquire the image thereof (step S13; image pickup step). Moreover, the image acquiring unit 29 outputs the acquired image as image data to the image pickup control unit 19.

The image data outputted from the image acquiring unit 29 is quantized by the image pickup control unit 19 and the image processing such as removal of noises is then conducted in the image processing unit 20.

In a case in which there are a plurality of light spots projected onto the projection screen 17, the extraction unit 32 extracts the projected light spot, which is an object of measurement, from the plurality of light spots projected onto the projection screen 17 on the basis of the processed image processed in the image pickup control unit 19 and the image processing unit 20 (extraction step), and the measurement unit 33 measures the intensity (lightness), size (dimension), coordinate value (position) and others of the projected light spot which is the object of measurement (step S14; measurement step).

In a case in which, after the measurement, the deflection angle of the mirror plane 11 is changed before the measurement is again made (see the continuous measurement route from step S15), the operational flow returns to the step S12. On the other hand, in the case of the termination of the measurement (see the measurement termination route from step S15), the measurement is brought into a termination.

Figure 5:
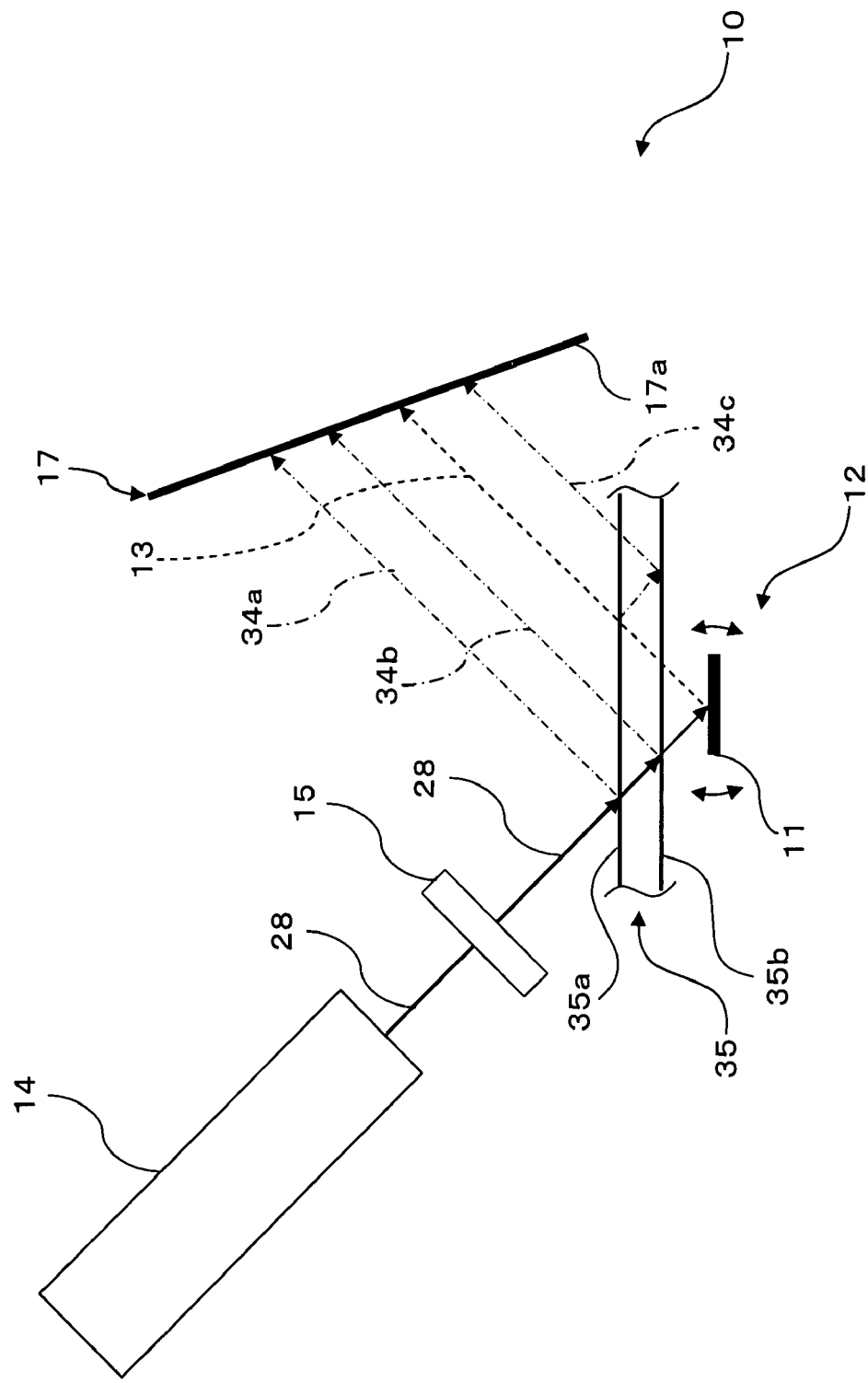
FIG. 5 is an illustrative view showing an example of a configuration of a measurement apparatus according to an embodiment of the present invention.
Figure 6:
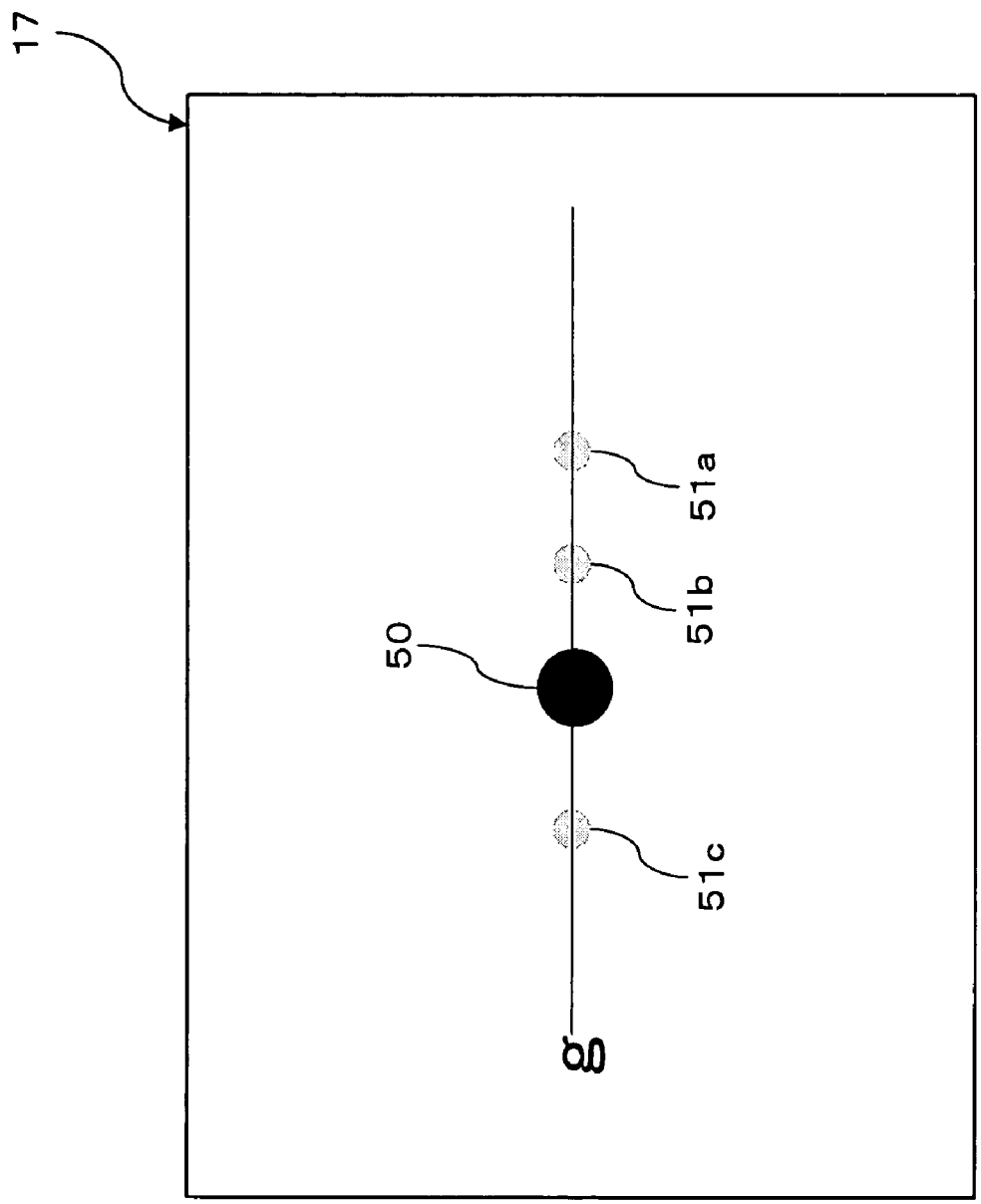
FIG. 6 is an illustration of an example of an image picked up by an image pickup unit of a measurement apparatus according to an embodiment of the present invention.
Figure 7:
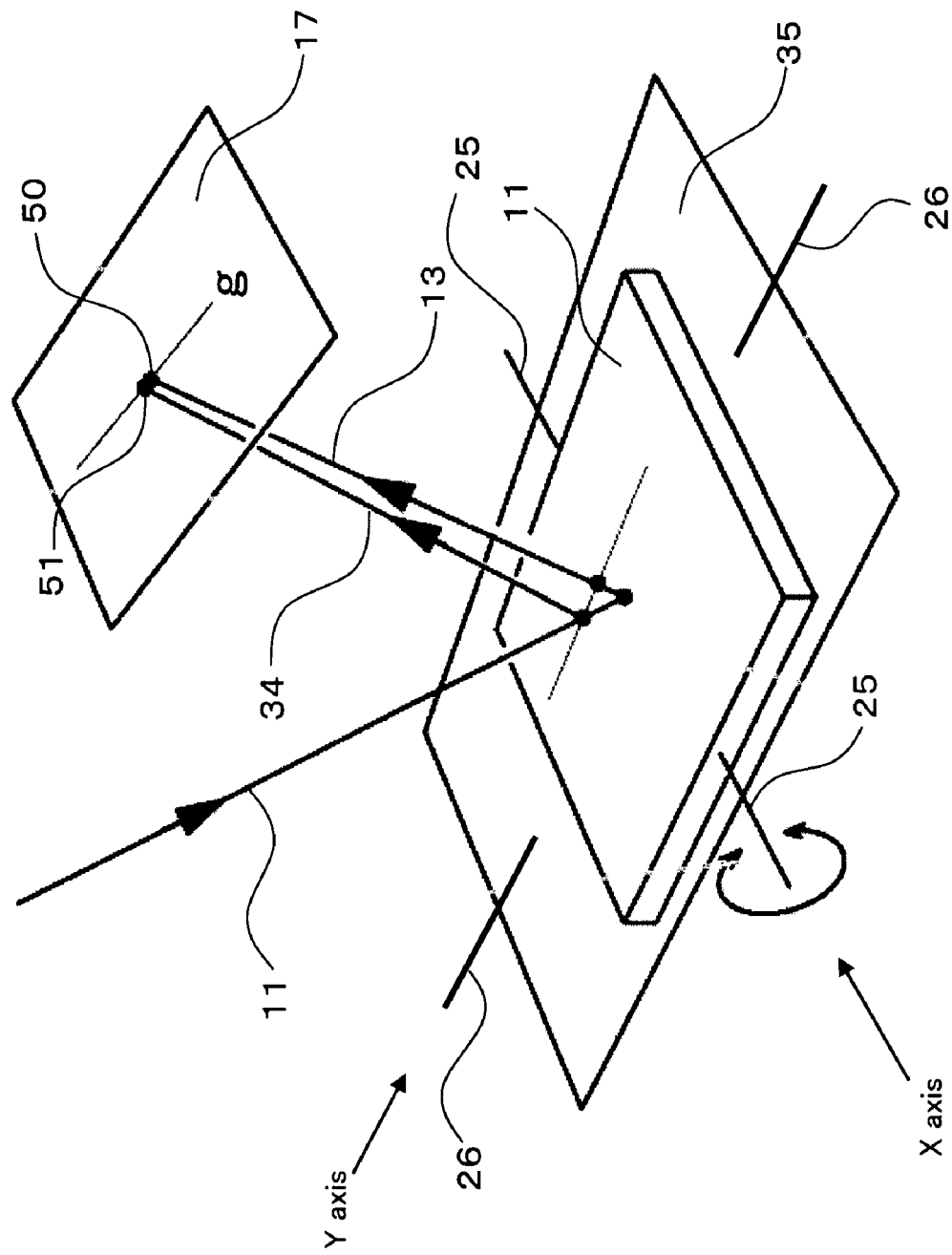
FIG. 7 is an illustrative view showing an example of a configuration of a measurement apparatus according to an embodiment of the present invention.
Figure 8:
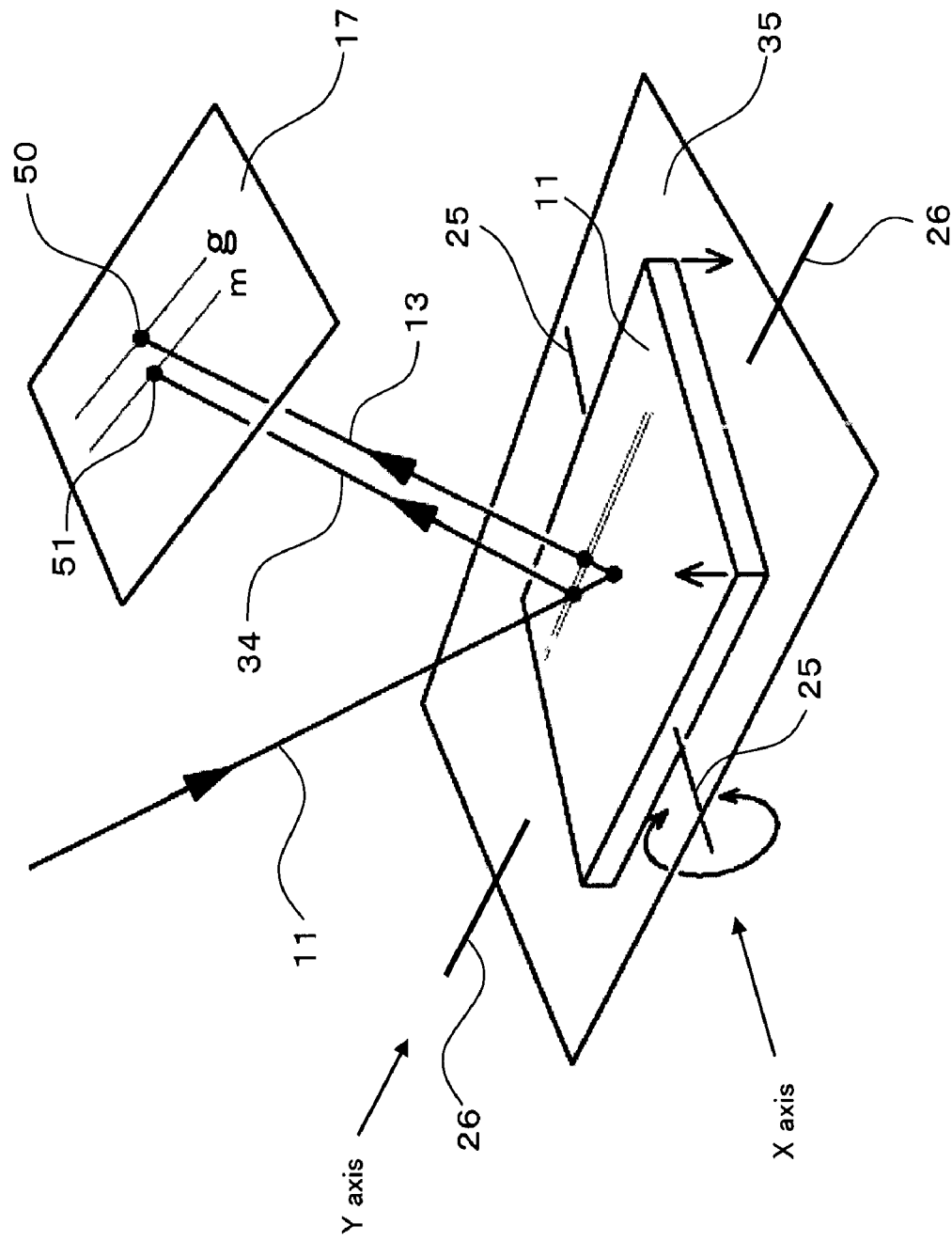
FIG. 8 is an illustrative view showing an example of a configuration of a measurement apparatus according to an embodiment of the present invention.
Figure 9:
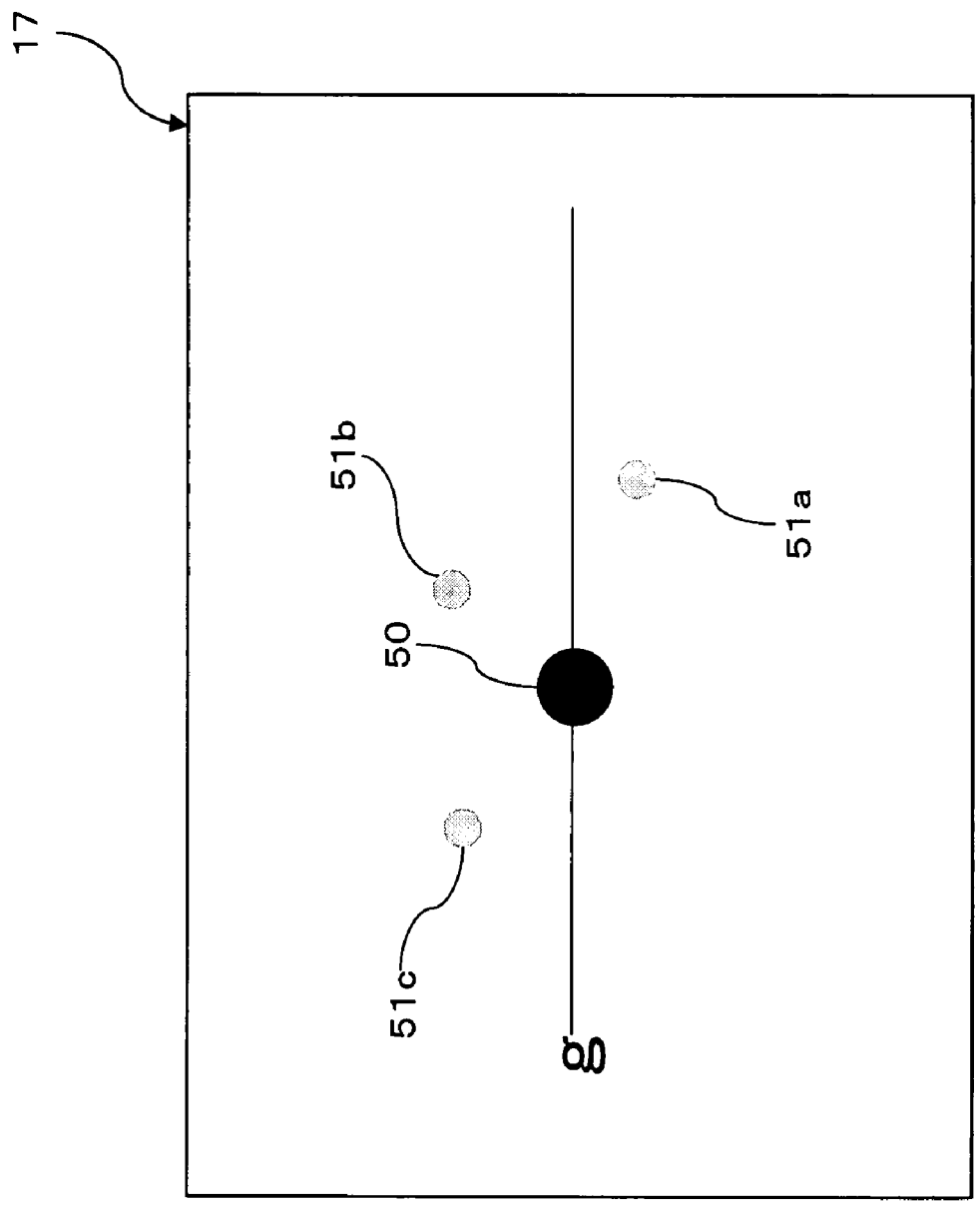
FIG. 9 is an illustration of an example of an image picked up by an image pickup unit of a measurement apparatus according to an embodiment of the present invention.

FIG. 5 is an illustration of an example of a case of measuring a mirror system, in which a cover glass is provided outside a mirror plane, by using a measurement apparatus according to an embodiment of the present invention, FIG. 6 is an illustration of an example of an image picked up by an image pickup unit in this case, FIG. 7 is an illustration of an example of a case in which a light spot of reflected light and a light spot of unnecessary light are displayed in a state arranged on the same (one) line, FIG. 8 is an illustration of an example of a case in which a light spot of reflected light and a light spot of unnecessary light are displayed on different lines, and FIG. 9 is an illustration of an example of an image picked up by the image pickup unit in a state shown in FIG. 8.

As FIG. 5 shows, in a case in which, outside the mirror plane 11, a cover glass (glass plate) 35 is provided in order to protect the mirror plane 11, the laser light 28 emitted from the measurement light source 14 is reflected on the mirror plane 11 so as to not only form the reflected light 13 but also form each of unnecessary lights 34a, 34b and 34c because of being reflected on a front surface 35a and rear surface 35b of the cover glass 35. Thus, as shown in FIG. 6, in addition to the projected light spot 50, unnecessary light spots 51a, 51b and 51c of the unnecessary lights 34a, 34b and 34c are displayed on the projection screen 17.

A description will be given hereinbelow of a case of making the measurement by use of a measurement apparatus according to an embodiment of the present invention without the influence of the unnecessary lights.

The measurement apparatus 10 according to the embodiment of the present invention captures, as an image, lights (reflected light 13, unnecessary lights 34a, 34b, 34c) reflected from the MEMS mirror 12 and the cover glass 35 to distinguish between the reflected light 13 deflected by the mirror plane 11 and the unnecessary lights 34a, 34b and 34c reflected from the cover glass 35 on the basis of the occurrence or non-occurrence of movement stemming from the deflection, the intensities and others for selecting the target light (reflected light 13) from a plurality of acquired images and measuring it.

First, a description will be given hereinbelow of a method of extracting only a projected light spot, which is an object of measurement, on the basis of a feature of a light spot projected on a projection screen.

In a case in which there are a plurality of light spots (in the example shown in FIG. 6, four light spots: 50, 51a, 51b, 51c) projected on the projection screen 17, the extraction unit 32 is made to extract the projected light spot 50, which is an object of measurement, from these plurality of light spots 50, 51a, 51b and 51c on the basis of the images picked up by the image pickup unit 18, which enables the projected light spot 50 being the object of measurement to be detected on the basis of a plurality of luminescent spots (light spots 50, 51a, 51b, 51c). The method using a PSD cannot achieve this detection. In addition, with respect to each of these plurality of light spots 50, 51a, 51b and 51c, it is possible to obtain a luminescent spot center (center of gravity) position, size, luminance and others, thereby enabling a luminescent spot (projected light spot 50) of the main light beam to be extracted on the basis of these information.

Concretely, on the basis of a result of measurement of a center (center of gravity) position, size (dimension), luminance (light spot intensity) and others of each of the plurality of light spots 50, 51a, 51b and 51c, the extraction unit 32 can extract, as the projected light spot 50 which is an object of measurement, for example, the light spot having the highest luminescent spot intensity (or light spot having a luminescent spot intensity nth in order; n represents a natural number) or the light spot having the largest luminescent spot size (or the light spot having a luminescent spot size nth in order; n represents a natural number). Moreover, it is also appropriate to extract the position of the projected light spot (luminescent spot formed by the main light beam) 50, which is an object of measurement, on the basis of an array position of the light spots (luminescent spots) 50, 51a, 51b and 51c.

In addition, it is also appropriate that the extraction unit 32 picks up an image of the MEMS mirror 12 (deflection mirror under measurement) at a home position (in a state of no rotation) to obtain a difference from an image in the case of a deflection to each angle for removing the luminescent spots stemming from the lights (unnecessary light spots 51a, 51b, 51c) reflected directly from the cover glass 35. That is, it is also appropriate to extract the projected light spot 50, which is an object of measurement, on the basis of the difference in coordinate value between a plurality of light spots before and after a change of the deflection angle of the mirror plane 11, or to extract it by a combination of the above-mentioned techniques.

Furthermore, a description will be given hereinbelow of a method of avoiding the influence of unnecessary light by using a technique of controlling one torsion bar spring of the MEMS mirror 12 in a state where the other torsion bar spring thereof is fixed at a predetermined deflection angle.

In a measurement apparatus shown in FIG. 7, the projected light spot 50 which is an object of measurement is made to move along a line g on the projection screen 17 according to revolutions of the first torsion bar springs 25 and 25 in the MEMS mirror 12, and the unnecessary light 51 due to the reflection from the front surface 35a or rear surface 35b of the cover glass 35 appears on the line g in the vicinity of the projected light spot 50, which can cause the interference with the measurement. Moreover, in this case, when the projected light spot 50 is moved along the line g by rotating the first torsion bar springs 25 and 25, there is a possibility that the projected light spot 50 and the unnecessary light spot 51 are put on the projection screen 17 in an overlapping state with each other, which makes it difficult to distinguish between the projected light spot 50 and the unnecessary light spot 51.

For this reason, in this embodiment, in a case in which the MEMS mirror 12 has two deflection axes (mirror axes) of an X axis and a Y axis as shown in FIG. 8, for measurement of a deflection characteristic relative to any one of the two axes, the measurement is conducted to make a deflection on one mirror axis to previously deflect a beam (reflected light 13 or unnecessary light 34) toward a position having less influence of the cover glass 35 and others. Thus, in a case in which a deflection mirror under measurement has a plurality of deflection axes, at the measurement relative to one axis, the other axis is controlled so as to make a deflection angle more or less with respect to a home position (in a state of no revolution), thereby making a distance (separation) between a luminescent spot (unnecessary light spot 51) unnecessary for the measurement and a luminescent spot (projected light spot 50) stemming from the main light beam. This method is particularly effective in the case of a small deflection angle, so the overlapping state between the projected light spot 50 and the unnecessary light spot 51 is avoidable on the projection screen 17.

Therefore, as shown in FIG. 8, the second torsion bar springs 26 and 26 (one rotation axis; non-measurement axis) is rotated (offset) in advance so that the unnecessary light spot 51 (luminescent spot due to the unnecessary light; luminescent spot unnecessary for the measurement) is positioned on a line m (which runs parallel with the line g in FIG. 8) deviating from the line g, so the reflected light from the deflection mirror and the reflected light from the cover glass are not positioned on the same (one) line as shown in FIG. 9, thus allowing the accurate measurement.

That is, since the projected light spot 50 which is an object of measurement can be separated from the luminescent spots (unnecessary light spots 51a, 51b, 51c) resulting from the unnecessary reflections by rotating the non-measurement axis in advance, even in a case in which the first torsion bar springs 25 and 25 (the other rotary shaft) are rotated so as to shift the projected light spot 50 (luminescent spot resulting from the main light beam), the projected light spot 50 and the unnecessary light spot 51 are not displayed on the projection screen 17 in an overlapping state (see FIG. 9).

For example, in a case in which, as shown in FIG. 6, the projected light spot 50 and the unnecessary light spots 51a, 51b, 51c are displayed in the projection screen 17 in a state arranged on the line g along which the projected light spot 50 moves according to the revolutions of the first torsion bar springs 25 and 25, the unnecessary light spots 51a, 51b and 51c are shifted up to positions deviating from the line g by rotating the axes (second torsion bar springs 26 and 26 in the example shown in FIG. 8) which are not involved in the measurement. In this state, the control unit 31 rotates only the first torsion bar springs 25 and 25, thus controlling the deflection angle of the mirror plane 11 before measurement.

Secondly, a description will be given hereinbelow of a case of measuring a deflection characteristic of the MEMS mirror 12, which varies (oscillates, deflects) in deflection angle of the mirror plane 11 at a high speed, by use of a measurement apparatus according to an embodiment of the present invention.

Figure 10:
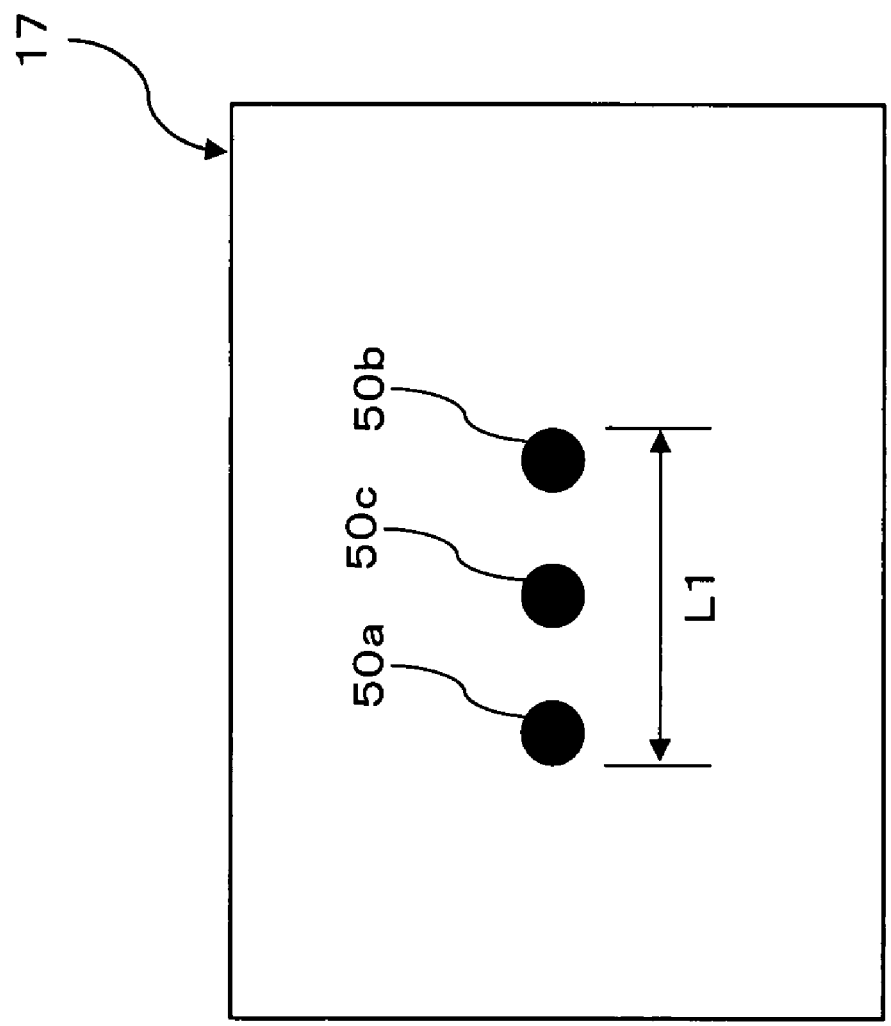
FIG. 10 is an illustration of an example of an image picked up by an image pickup unit of a measurement apparatus according to an embodiment of the present invention.
Figure 11:
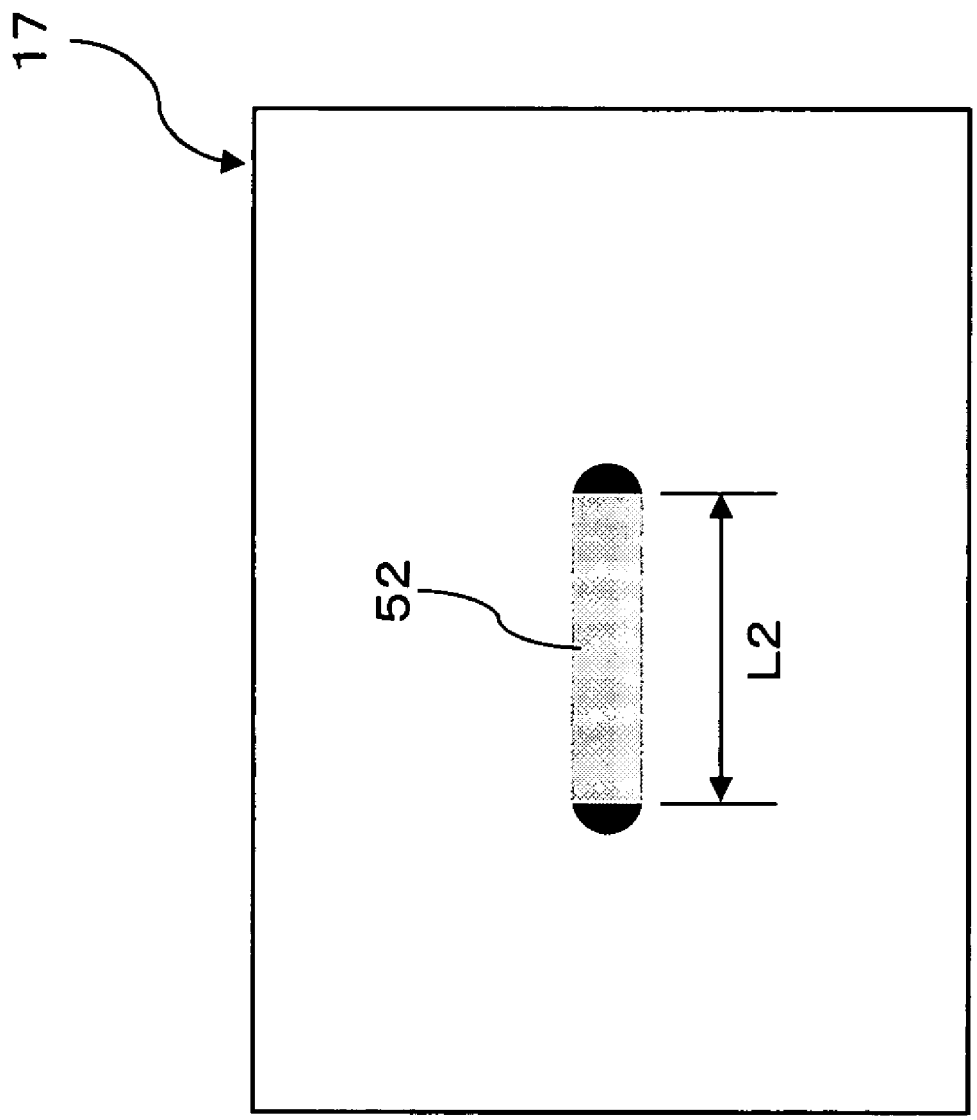
FIG. 11 is an illustration of an example of an image picked up by an image pickup unit of a measurement apparatus according to an embodiment of the present invention.
Figure 12:
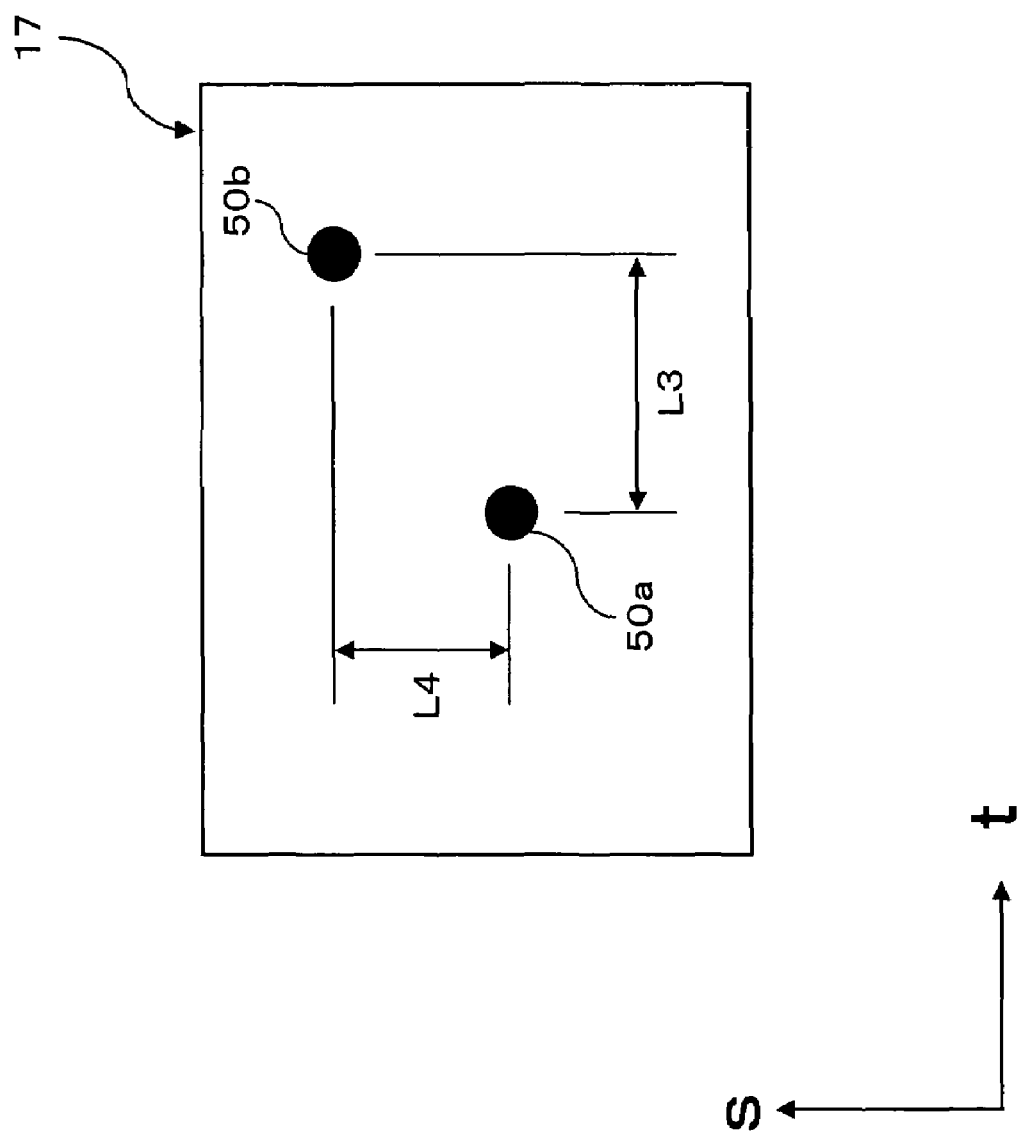
FIG. 12 is an illustration of an example of an image picked up by an image pickup unit of a measurement apparatus according to an embodiment of the present invention.
Figure 13:
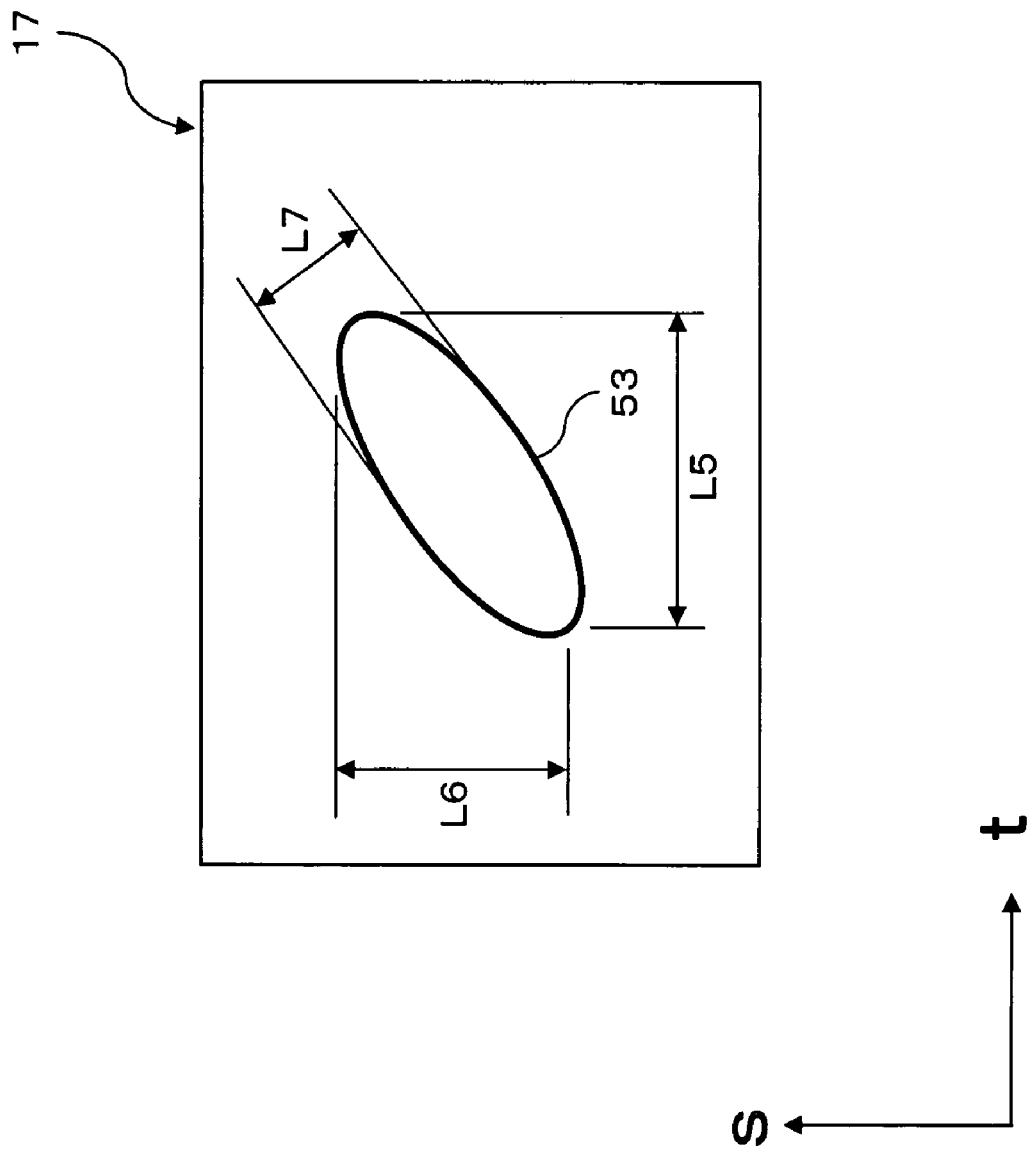
FIG. 13 is an illustration of an example of an image picked up by an image pickup unit of a measurement apparatus according to an embodiment of the present invention.

FIG. 10 is an illustration of, in a case in which a deflection angle of a mirror plane oscillates (varies) at a high speed, an example of an image picked up by an image pickup unit in a measurement apparatus according to an embodiment of the present invention, FIG. 11 is an illustration of an example of an image picked up in a state where the shutter speed of the image pickup unit is set at a long time in the case shown in FIG. 10, FIG. 12 is an illustration of, in a case in which two-axes torsion bar springs are driven at the same time, an example of an image picked up by an image pickup unit in a measurement apparatus according to an embodiment of the present invention, and FIG. 13 is an illustration of an example of an image picked up in a state where the shutter speed of the image pickup unit is set at a long time in the case shown in FIG. 12.

In this embodiment, the measurement unit 33 is made to measure a quantity (distance) of movement of the projected light spot 50, which moves according to an change of the deflection angle of the mirror plane 11 by the control unit 31, on the basis of an image of the rear surface 17b taken by the image pickup unit 18.

First, a description will be given hereinbelow of a method of measuring a quantity of movement on the basis of the images taken before and after the change of the deflection angle of a mirror plane.

In this embodiment, the image pickup unit 18 picks up, a first image, an image of the projected light spot 50 before the change of the deflection angle of the mirror plane 11 by the control unit 31 and further picks up, as a second image, an image of the projected light spot 50 after the change of the deflection angle of the mirror plane 11 by the control unit 31, and the measurement unit 33 measures the length L1 between the projected light spots 50 and 50 on the basis of the coordinate values of the projected light spot 50 corresponding to the first image and projected light spot 50 corresponding to the second image, thereby obtaining a quantity of deflection (deflection angle) of the mirror plane 11, and others.

Subsequently, a description will be given hereinbelow of a method of measuring a quantity of movement in a state where the shutter speed of the image pickup unit 18 is set at a long time.

In the case of such a method of calculating a quantity of movement on the basis of the respective coordinate values of the projected light spots 50 before and after the change of the deflection angle of the mirror plane 11, for measuring a deflection characteristic of the MEMS mirror 12 the mirror plane 11 of which oscillates (deflects) in deflection angle at a high speed, since light spots (three projected light spots 50a, 50b, 50c in the example shown in FIG. 10) are picked up intermittently as shown in FIG. 10 by picking up an image continuously, for acquiring the accurate quantity of movement of the projected light spot 50, there is a need to carry out the image pickup in a state synchronized with an oscillation frequency and delayed appropriately.

However, this requires the preparation of a synchronous circuit for the synchronization with the oscillation frequency and the adjustment for the delayed image pickup, which complicates the measurement operations.

In the example shown in FIG. 10, the three projected light spots 50a, 50b and 50c picked up by the image pickup unit 18 are displayed in the same (one) image by means of the multiple exposure.

Accordingly, in a case in which the reflected light 13 moves at a high speed according to the high-speed oscillation (deflection) of the deflection angle of the mirror plane 11 of the MEMS mirror 12 under control of the control unit 31, the image pickup unit 18 carries out the image pickup in a state where the shutter speed (time to be taken for the light acceptance onto an imaging element; image pickup storage/accumulation time) is set at a long time, thereby picking up an image of a trajectory 52 (see FIG. 11) of the projected light spot 50. The time for the light acceptance by the imaging element is set at a period of time sufficiently longer than the oscillation cycle of the mirror plane 11.

Thus, in this technique, as shown in FIG. 11, the image pickup unit 18 picks up an image of a trajectory (locus) 52 of the projected light spot 50 while the control unit 31 is changing the deflection angle of the mirror plane 11, and the measurement unit 33 measures the length L2 of the trajectory 52 of the projected light spot 50 taken by the image pickup unit 18, thereby obtaining a quantity of deflection (maximum deflection angle and others) of the mirror plane 11. Moreover, at this time, it is possible to obtain a quantity of deflection of the mirror plane 11 regardless of the drive frequency of a drive signal generated by the drive waveform generating unit 22.

This method is a technique of achieving the measurement without using a high-speed optical detector with respect to the deflection angle measurement at the high-speed deflection operation, and the image pickup storage time (shutter speed) of the image acquiring unit 29 is set to be long so as to capture the trajectory 52 of light (reflected light 13) due to the deflection of the MEMS mirror 12 for detecting the maximum length L2 of the trajectory 52 as a quantity of deflection.

Furthermore, a description will be given hereinbelow of a method of measuring a deflection characteristic of the MEMS mirror 12 by driving the torsion bar springs 25, 25 and 26, 26 simultaneously (in two axial directions) in a measurement apparatus according to an embodiment of the present invention.

In this method, for the measurement of a characteristic of the MEMS mirror 12, the measurement unit 33 drives the torsion bar springs 25, 25 and 26, 26 at the same time to two-dimensionally measure the movement of the projected light spot 50 projected onto the projection screen 17.

That is, by driving the torsion bar springs 25, 25 and 26, 26 at the same time, as shown in FIG. 12, the image pickup unit 18 first picks up, as a first image, an image of a projected light spot 50a before a change of the deflection angle of the mirror plane 11 by the control unit 31 and then picks up, as a second image, an image of a projected light spot 50b after the change of the deflection angle of the mirror plane 11 by the control unit 31, and the measurement unit 33 measures a length L3 between the projected light spots 50a and 50b in a t-direction and a length L4 therebetween in an s-direction on the basis of the coordinate value of the projected light spot 50a corresponding to the first image and the coordinate value of the projected light spot 50b corresponding to the second image through the use of the above-mentioned technique of calculating a quantity of movement of the projected light spot 50 before and after the change of the deflection angle of the mirror plane 11, thereby obtaining a quantity of deflection (maximum deflection angle and others) of the mirror plane 11.

In the example shown in FIG. 12, the two projected light spots 50a and 50b picked up by the image pickup unit 18 are displayed in the same (one) image by means of the multiple exposure.

Furthermore, by driving the torsion bar springs 25, 25 and 26, 26 at the same time and by using the above-mentioned method of measuring a quantity of movement of a light spot in a state where the shutter speed is set at a long time, as shown in FIG. 13, the image pickup unit 18 can also pick up an image of a trajectory (Lissajous's figure) 53 of the projected light spot 50 while the control unit 31 changes the deflection angle of the mirror plane 11.

The measurement unit 33 judges the trajectory (Lissajous's figure) 53 of the projected light spot 50 picked up by the image pickup unit 18, which can measure the characteristics relative to the X axis and the Y axis and the correlation between the two axes (delay of phase or the like). For example, it is possible to obtain the correlation between two axes (delay of phase or the like) by measuring a length L5 in the t-direction and a length L6 in an s-direction, by obtaining a quantity of deflection (maximum deflection angle and others) of the mirror plane 11, or by measuring a length L7 of a minor axis of a trajectory 53 formed as an elliptic Lissajous's figure.

Incidentally, in the MEMS mirror 12 having two axes, in the case of the simultaneous driving/measurement with respect to two axes, the trajectory drawn by deflected light does not show a straight line (draws a circular arc) with respect to an axis making the incident light and the rotary shaft in parallel. Accordingly, there is a need to correct the value picked up/measured by the image pickup unit 18.

Thus, with the measurement apparatus 10 according to the embodiment of the present invention, the reflected light 13 formed in a manner such that the laser light 28 is reflected on the mirror plane 11 is projected onto the projection surface 17a of the projection screen 17 and an image of the projection surface 17a on which this reflected light 13 is projected is picked up by the image pickup unit 18, which enables the two-dimensional measurement of a deflection characteristic (maximum deflection angle, deflection angle when a predetermined voltage is inputted, deflection velocity and resonance point when an inputted voltage is changed by a predetermined oscillation frequency, and others) of the MEMS mirror 12 on the basis of the image of the projection surface 17a picked up by the image pickup unit 18. Moreover, it is possible to easily measure the deflection characteristic of the MEMS mirror 12 by visually confirming the image of the projection surface 17a picked up thereby, and to achieve the high-accuracy measurement by carrying out the image processing on the picked-up image of the projection surface 17a by means of the image processing unit 20, the processing terminal 21 and others. Still moreover, since the measurement of the deflection characteristic of the MEMS mirror 12 can be made only by picking up an image of the projection surface 17a on which the reflected light 13 is projected as the projected light spot 50, the measurement can be made within a short period of time without carrying out the complicated condition setting such as the disposition of measurement equipment. Therefore, the deflection characteristic of the MEMS mirror 12 can be measured easily within a short period of time with high accuracy.

In addition, since the light (reflected light 13) deflected by the MEMS mirror 12 is projected onto the projection screen 17 and the image of the rear surface 17b thereof is picked up by the image pickup unit 18, the restriction is not imposed on the image pickup element size of the image acquiring unit 29 and on the position of the image pickup unit 18, which can provide a high convenience.

Still additionally, in comparison with conventional methods using the PSD, the measurement system having a higher function and accuracy higher by one figure or more can easily configured at a lower cost (it can achieve the cost reduction up to one severalth in comparison with the PSD method having the same function).

Furthermore, in a case in which the cover glass 35 or the like is provided outside the mirror plane 11, even if, combined with the projected light spot 50 which is an object of measurement, a plurality of unnecessary lights 34a, 34b and 34c other than the object of measurement are projected as unnecessary light spots 51a, 51b and 51c onto the projection surface 17a, these plurality of light spots 50, 51a, 51b and 51c can easily be judged on the basis of the images picked up by the image pickup unit 18, which enables only the projected light spot 50 which is the object of measurement to be extracted from the plurality of light spots 50, 51a, 51b and 51c, thus allowing the high-accuracy measurement. This signifies that the detection (measurement) can be made without being affected by the unnecessary light 34 from the cover glass 35 and others.

Still furthermore, the deflection characteristic of the MEMS mirror 12 is measured on the basis of the reflected light 13 from the mirror surface 11 under control of the control unit 31, which enables the deflection characteristic of the MEMS mirror 12 to be more accurately measured on the basis of the control information (drive condition) from the control unit 31 and the deflection angle of the mirror surface 11.

Yet furthermore, since a diffusion plate which allows the transmission of a portion of the reflected light 13 from the mirror plane 11 is used as the projection screen 17 and the image of the rear surface 17b of the projection screen 17 is picked up by the image pickup unit 18 from the rear surface 17b side of the projection screen 17, the image formation of a laser light (high energy density light) 28 outputted from the measurement light source 14 in a state diaphragmed slenderly for the measurement is made on the projection screen 17 so as not to be incident directly on the image pickup unit 18, thereby preventing the image pickup unit 18 from being damaged by the laser light 28.

Moreover, in the projection surface 17a, when the reflected light 13 from the mirror surface 11 is incident on the projection surface 17a at an angle different from 90°, the reflected light 13 incident on the projection screen 17 is reflected on the projection surface 17a. In this case, the reflected light reflected from this projection screen 17 makes an interference or the like with the laser light 28 or the reflected light 13 from the mirror plane 11, so the measurement does not become unstable and the deflection characteristic of the MEMS mirror 12 can be measured with higher accuracy.

Still moreover, when the quantity of movement of the projected light spot 50 moving according to a change of the deflection angle of the mirror plane 11 under control is measured on the basis of the picked-up image of the projection screen 17, the easy measurement of the deflection characteristic of the MEMS mirror 12 becomes feasible.

Yet moreover, the image of the projected light spot 50a before the deflection angle of the mirror plane 11 is changed is first picked up as a first image and the image of the projected light spot 50b after the deflection angle of the mirror plane 11 has been changed is then picked up as a second image so that the length L1 between the respective projected light spots 50a and 50b is measured on the basis of the coordinate value of the projected light spot 50a corresponding to the first image and the coordinate value of the projected light spot 50b corresponding to the second image so as to obtain a quantity of movement of the projected light spot 50. This enables the two-dimensional detection of the movement of the reflected light 13 from the MEMS mirror 12 and allows the measurement of the deflection characteristic of the MEMS mirror 12 involved in the deflecting operation of the mirror plane 11.

In addition, by picking up the image of the trajectory 52 of the projected light spot 50 during the change of the deflection angle of the mirror plane 11 to measure a quantity of measurement of the projected light spot 50 on the basis of the length L2 of the trajectory 52 of the projected light spot 50 image-picked up, the accurate quantity of movement of the projected light spot 50 can be measured even in a case in which the projected light spot 50 moves at a high speed due to the high-speed oscillation (deflection) of the deflection angle of the mirror plane 11 in the MEMS mirror 12, and it is possible to eliminate the need for the complicated adjustment such as the synchronization with the oscillation frequency and the appropriately delaying operation. Therefore, the quantity of movement of the projected light spot 50 corresponding to the deflection angle can easily and accurately be measured irrespective of the deflection velocity and oscillation frequency of the mirror plane 11.

In particular, when the projected light spot 50 reciprocates on the projection surface 17a due to the oscillation of the mirror plane 11, the accurate and easy measurement of the maximum quantity of movement of the projected light spot 50 is feasible on the basis of the trajectory 52 of the projected light spot 50.

In the image pickup unit 18, the easy image pickup of the trajectory 52 becomes feasible by picking up the image of the projection surface 17a in a state where the shutter speed is set at a long time.

Still additionally, in a case in which this technique is applied to the MEMS mirror 12 having two axes and each of the torsion bar springs 25, 25 and 26, 26 thereof is rotationally driven at a high speed, the image of the trajectory 53 of the projected light spot 50 picked up by the image pickup unit 18 draws, for example, a Lissajous's figure, and when the L5 thereof in the t-direction and the length L6 thereof in the s-direction are measured on the basis of the trajectory 53, the two-dimensional movement quantity of the reflected light 13 corresponding to the maximum deflection angle, and others, can be measured at the same time. Yet additionally, by measuring the length L7 of the trajectory 53 in its width direction, it is possible to measure the correlation (delay of phase and others) of these two-axes torsion bar springs 25, 25 and 26, 26. Therefore, the deflection characteristic of the MEMS mirror 12 having two axes can easily and accurately be measured regardless of the deflection speed and oscillation frequency of the mirror plane 11.

Moreover, when the projected light spot 50 which is an object of measurement is extracted from a plurality of light spots 50, 51a, 51b and 51c, projected onto the projection surface 17a, on the basis of the picked-up image, even if, in addition to the reflected light 13 which is the object of measurement, the unnecessary lights other than the object of measurement from the cover glass 35 or the like are projected onto the projection surface 17a, it is possible to easily distinguish between these plurality of light spots 50, 51a, 51b and 51c on the basis of the image of the rear surface 17b picked up by the image pickup unit 18, thereby achieving the measurement of the deflection characteristic of the MEMS mirror 12 with higher accuracy.

Still moreover, by extracting the projected light spot 50, which is the object of measurement, on the basis of the intensities, sizes and disposition positions of the plurality of light spots 50, 51a, 51b and 51c displayed as luminescent spots on the projection surface 17a, or by extracting the projected light spot 50, which is the object of measurement, on the basis of the difference in coordinate value between the light spots 50, 51a, 51b and 51c before and after a change of the deflection angle of the mirror plane 11, the projected light spot 50 which is the object of measurement can more accurately be extracted from the plurality of light spots 50, 51a, 51b and 51c projected on the projection surface 17a.

Yet moreover, when a plurality of luminescent spots are processed in a state grouped or when a selection among a plurality of luminescent spots (light spots 50, 51a, 51b and 51c) is carried out, it is possible to selectively detect (measure) the positions of a plurality of luminescent spots. Furthermore, it is possible to measure the deflection angle in the MEMS mirror 12 by grouping a plurality of luminescent spots and obtaining the average value of the quantities of movements of these pluralities of luminescent spots.

In addition, in a case in which the projected light spot 50 and the unnecessary light spots 51a, 51b and 51c are displayed on the projection screen 17 in a state arranged on the same line g on which the projected light spot 50 moves according to the rotations of the first torsion bar springs 25 and 25, the second torsion bar springs 26 and 26 are rotated so as to make a deflection angle of the mirror plane 11 so that the unnecessary light spots 51a, 51b and 51c are displayed at positions deviating from the line g, and only the first torsion bar springs 25 and 25 are then rotated to control the deflection angle of the mirror plane 11, thereby enabling the measurement to be made in a state where the projected light spot 50 and the unnecessary light spots 51a, 51b and 51c are separated from each other.

Still additionally, since the specification of the lens in the image pickup lens 30 can arbitrarily be selected to the projection screen 17 so as to freely set the disposition of each of the mirror plane 11, the projection screen 17 and the image pickup unit 18, the space saving of the measurement apparatus 10 becomes easily achievable. Yet additionally, since the projected light spot 50 which is an object of measurement, projected on the projection surface 17a, can be image-picked up in a state enlarged by employing a high-magnification lens in the image pickup lens, the deflection characteristic of the MEMS mirror 12 can be measured with higher accuracy and, even in the case of a small light acceptance plane in the image pickup unit 18, the deflection characteristic of the MEMS mirror 12 can be measured with high precision. Add to it that, since there is no need to use a high-resolution camera as the image pickup unit 18, the cost of the measurement apparatus 10 is reducible.

[2] Others

It should be understood that the present invention is not limited to the above-described embodiment, and that it is intended to cover all changes and modifications of the embodiment of the invention herein which do not constitute departures from the spirit and scope of the invention.

For example, although in the above-described embodiment the present invention is applied to the MEMS mirror 12 internally having the drive circuit 27, the present invention is not limited to this, but the present invention is also applicable to an MEMS mirror 12 equipped with the drive circuit 27 in the exterior thereof. Moreover, the present invention is also applicable to a mirror system other than the MEMS mirror 12. For example, it is also acceptable to apply the present invention to a galvanomirror in which a mirror plane is mounted on a shaft of a motor and the deflection angle of the mirror plane mounted on the motor shaft is controlled by driving the motor through the use of an electromagnetic force.

In addition, although in the above-described embodiment the projection surface 17a and rear surface 17b of the projection screen 17 are shaped into an irregular configuration, the present invention is not limited to this, but it is also appropriate that only one of the projection surface 17a and the rear surface 17b is shaped into an irregular configuration. Add to it that the configurations other than the above-mentioned projection surface 17a and rear surface 17b, i.e., various types of existing techniques which can diffuse the reflected light 13 projected thereon, are also employable.

Figure 14:
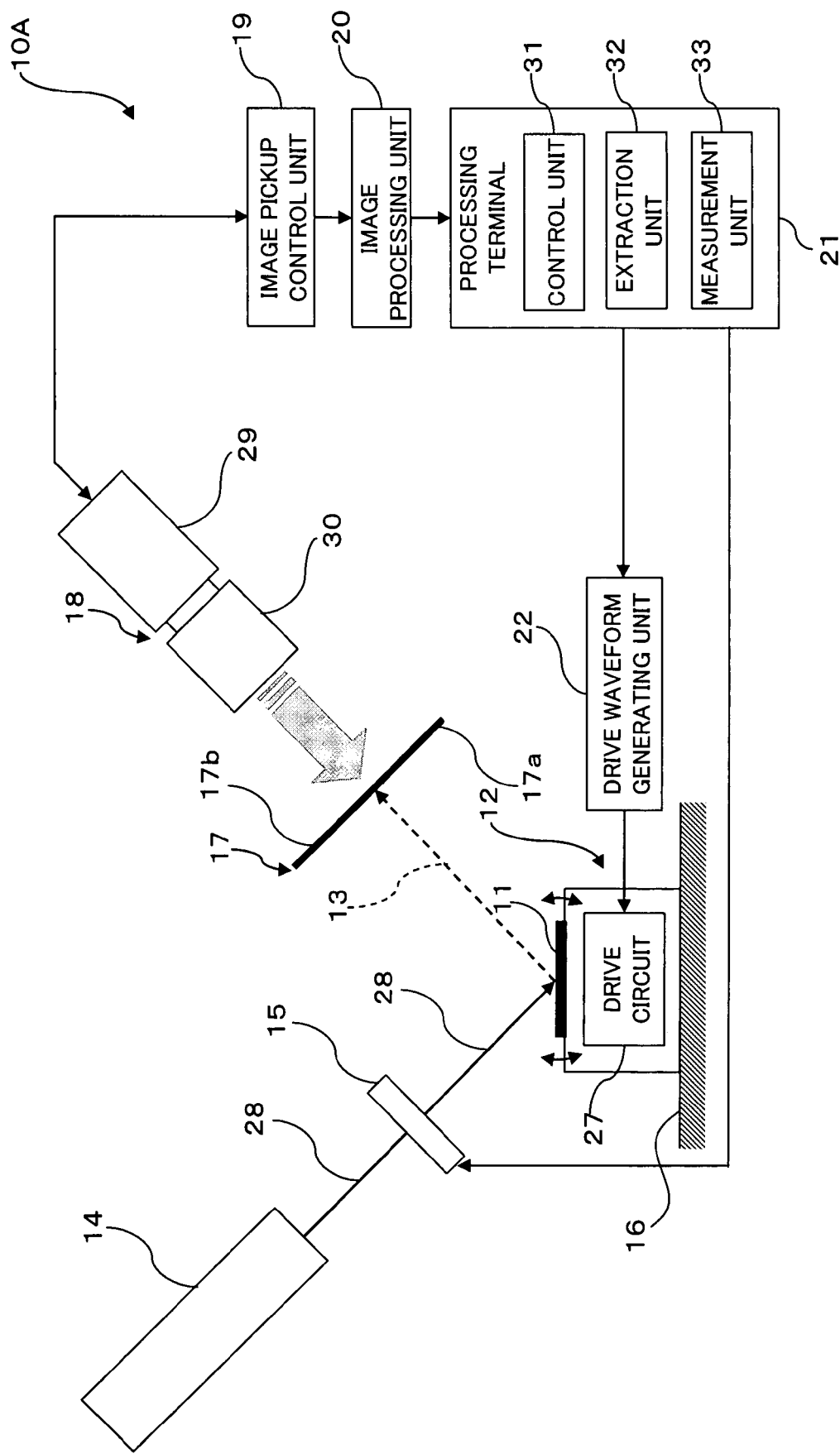
FIG. 14 is an illustrative view showing an example of a configuration of a first modification of a measurement apparatus according to an embodiment of the present invention.

Still additionally, although in the above-described embodiment the reflected light 13 is incident on the projection surface 17a at an incidence angle different from 90°, the present invention is not limited to this, but it is also possible that, as shown in FIG. 14 as a measurement apparatus 10A, the reflected light 13 is incident on the projection surface 17a at an angle of 90°. In this case, there is a need to consider that the measurement becomes unstable because the reflected light 13 returns to the mirror plane 11.

Figure 15:
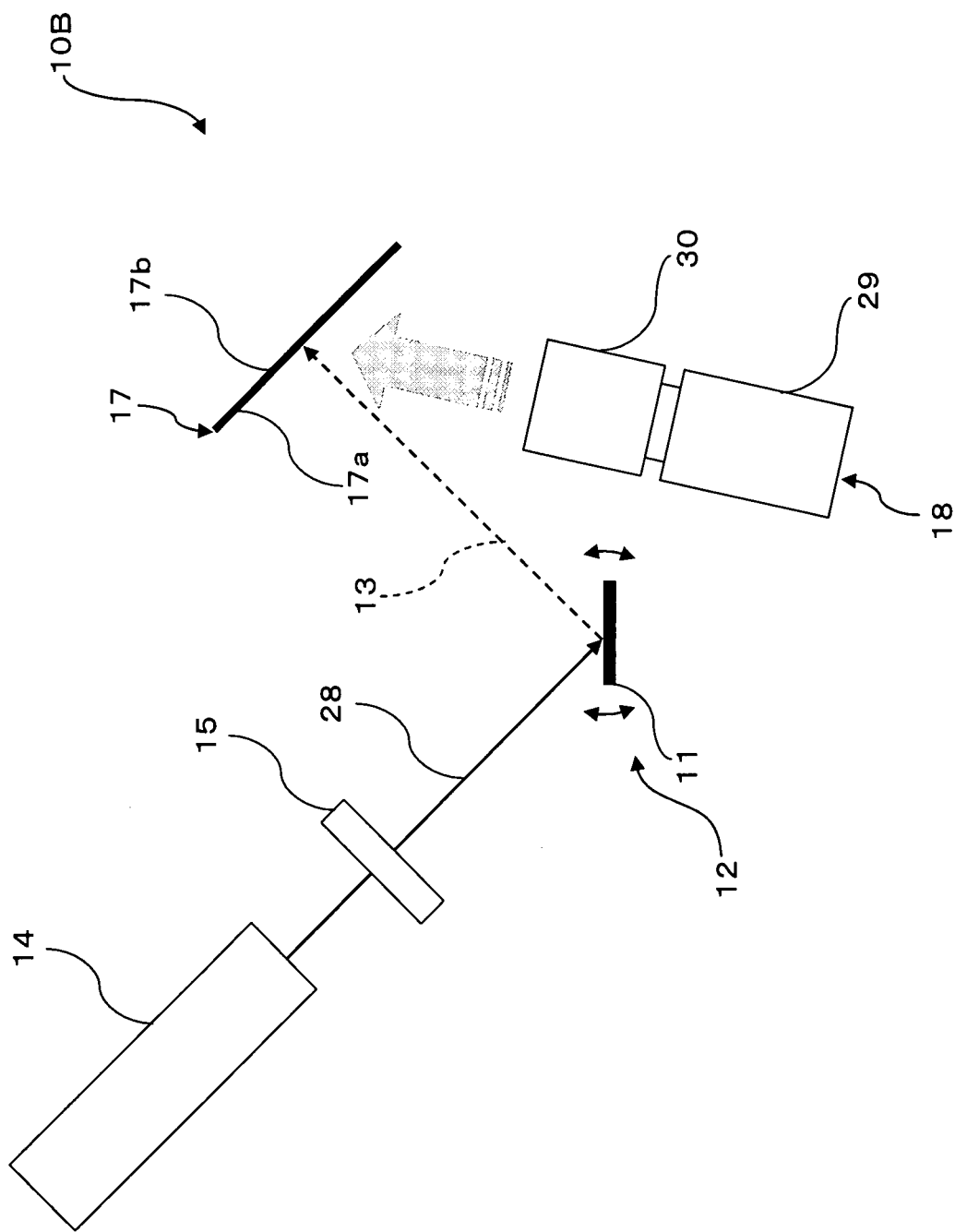
FIG. 15 is an illustrative view showing an example of a configuration of a second modification of a measurement apparatus according to an embodiment of the present invention.
Figure 16:
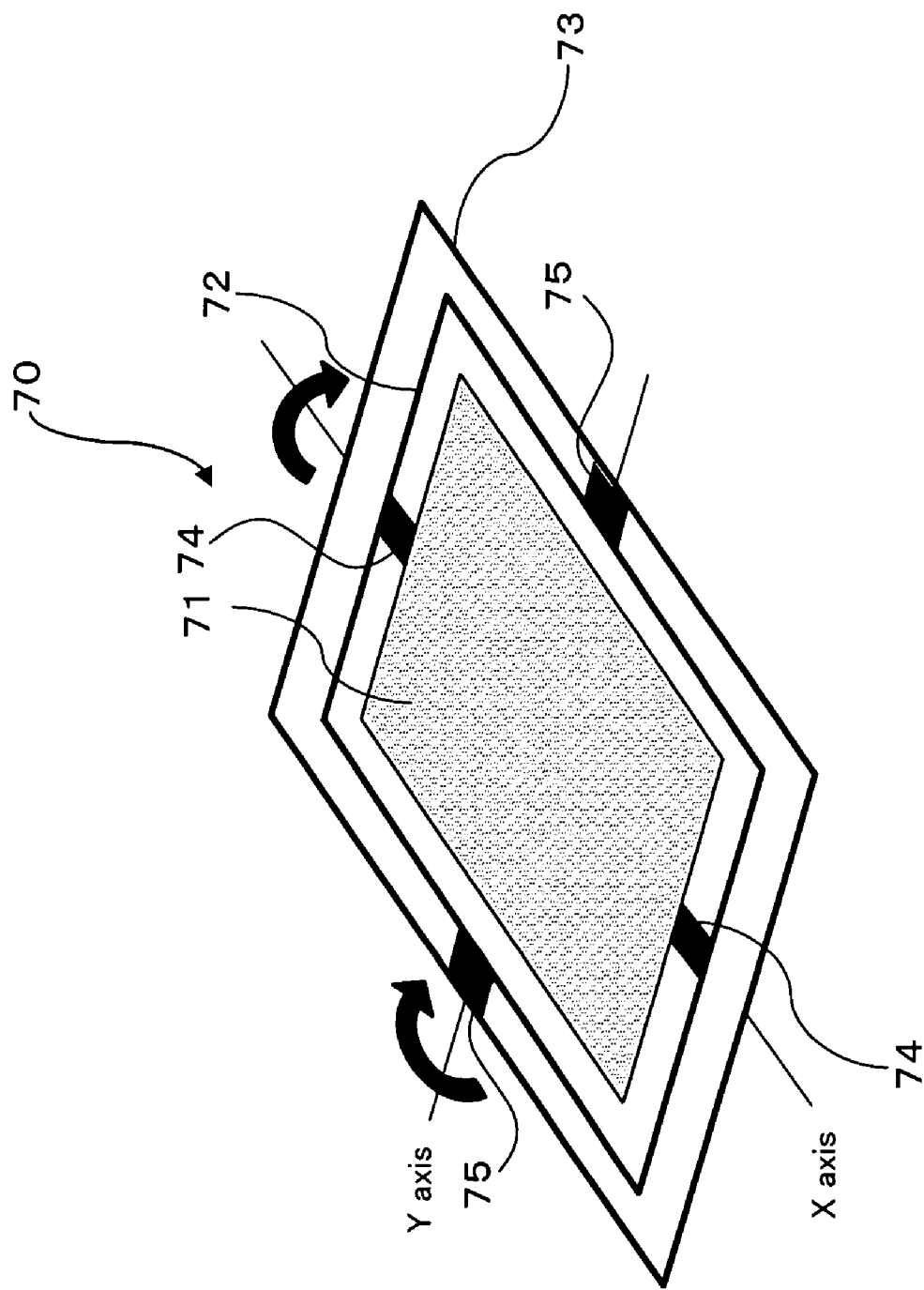
FIG. 16 is an illustrative view showing an example of a configuration of a conventional MEMS mirror.
Figure 17:
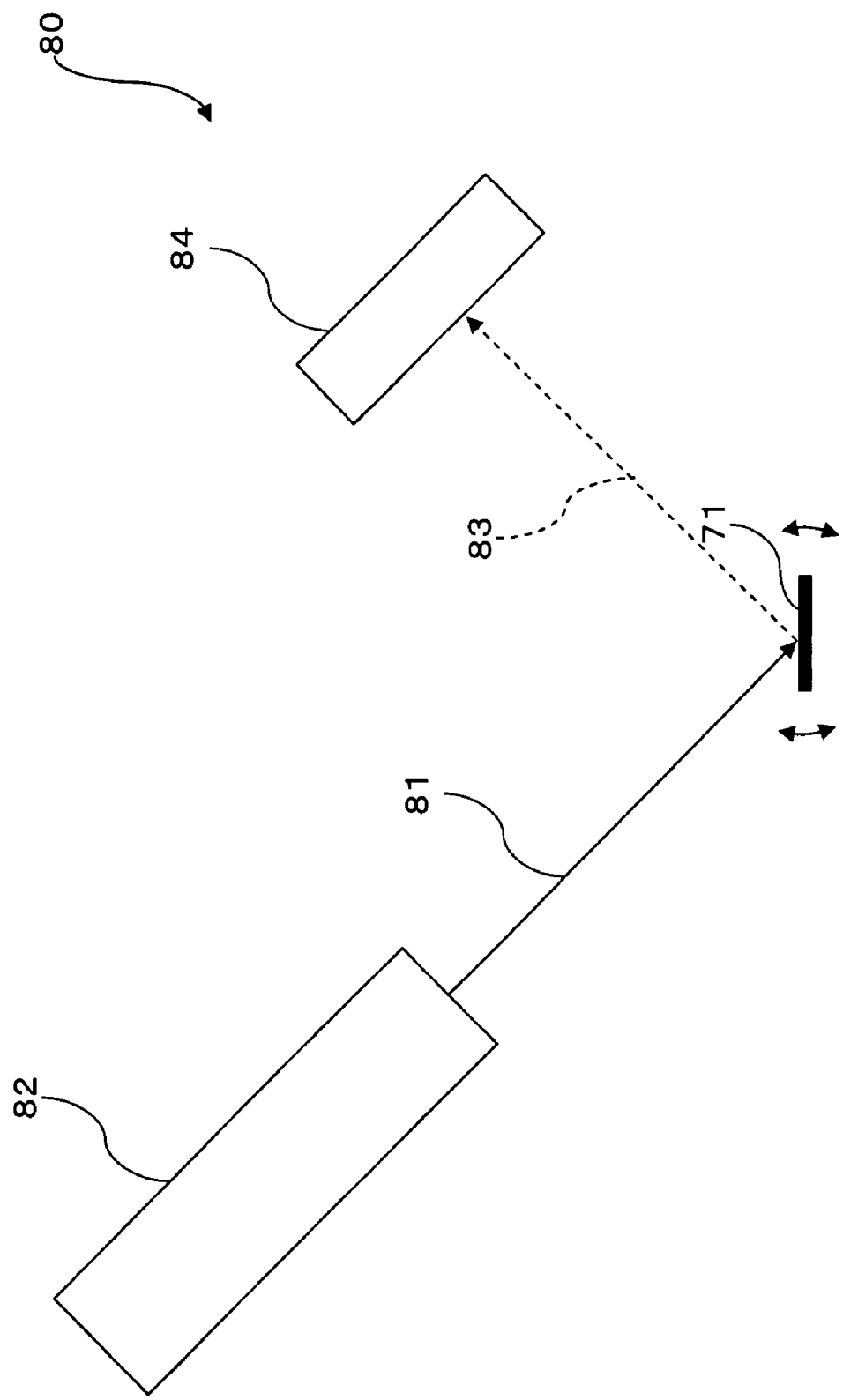
FIG. 17 is an illustrative view showing an example of a configuration of a conventional measurement apparatus.
Figure 18:
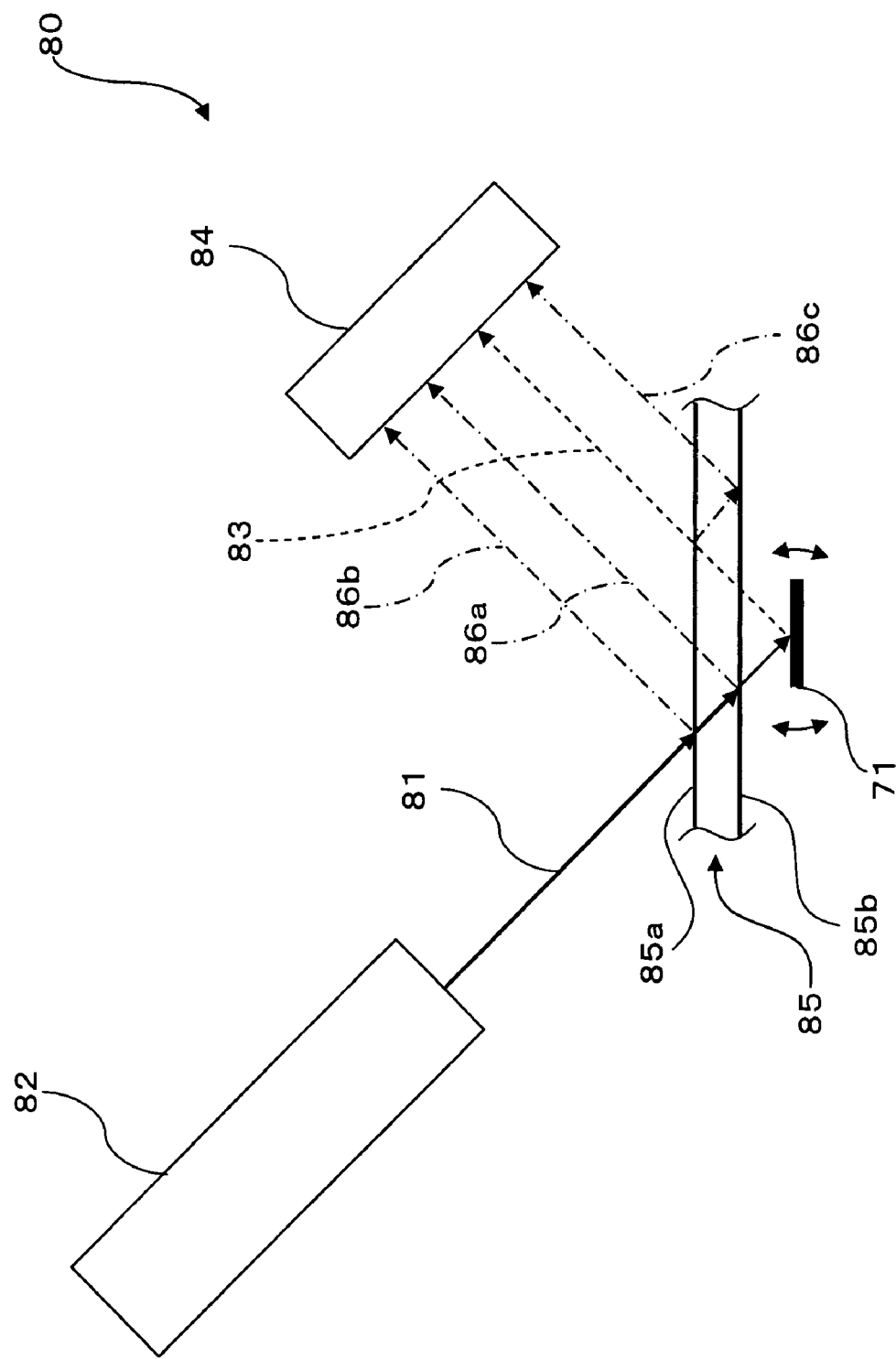
FIG. 18 is an illustrative view showing an example of a configuration of a conventional measurement apparatus.

Yet additionally, although in the above-described embodiment the image pickup unit 18 is designed to pick up an image of the rear surface 17b of the projection screen 17 from the rear surface 17b side of the projection screen 17, the present invention is not limited to this, but it is also appropriate that, as shown in FIG. 15 as a measurement apparatus 10B, the projection surface 17a of the projection screen 17 is image-picked up from the projection surface 17a side of the projection screen 17. In this case, there is no need for the projection screen 17 to be made of a translucent material.

Since the main purpose of this embodiment is originally for obtaining a deflection angle of the deflection mirror under measurement (MEMS mirror 12), the quantity of deflection can be acquired on the basis of the fact that a plurality of luminescent spots (light spots 50, 51a, 51b, 51c) vary simultaneously due to the movement of the deflection mirror (mirror plane 11) and, hence, it is not always necessary to carry out the separation between the respective luminescent spots. Therefore, although in the above-described embodiment the extraction unit 20 extracts the projected light spot 50, which is an object of measurement, from the plurality of light spots 50, 51a, 51b and 51c on the basis of an image picked up by the image pickup unit 18, the present invention is not limited to this, but it is also appropriate that the plurality of light spots 50, 51a, 51b and 51c are measured at the same time without using the extraction unit 20. Moreover, it is also appropriate that the measurement light source 14 emits, as the measurement light 28, a light beam other than laser light.

The above-mentioned MEMS mirror 12 can be manufactured by using various types of existing techniques (manufacturing step). In addition, the measurement apparatus 10 according to this embodiment is used in an inspection process (inspection step) for the MEMS mirror 12 which is a portion of this manufacturing process.

What is claimed is:

1. A measurement apparatus, which measures a characteristic of a mirror system having a mirror plane variable to arrange an inclination, comprising:
    a measurement light source for emitting measurement light onto the mirror plane;
    a projection unit on which reflected light formed when the measurement light emitted from said measurement light source is reflected from said mirror plane is projected as a projected light spot;
    an image pickup unit for picking up an image of said projection unit on which the reflected light is projected as the projected light spot;
    a control unit for controlling the inclination of said mirror plane; and
    a measurement unit for measuring a quantity of movement of the projected light spot, which moves according to a change of the inclination of said mirror plane controlled by said control unit, on the basis of the image of said projection unit picked up by said image pickup unit.

2. The measurement apparatus according to claim 1, wherein said image pickup unit first picks up, as a first image, an image of the projected light spot before a change of the inclination of said mirror plane by said control unit and then picks up, as a second image, an image of the projected light spot after the change of the inclination of said mirror plane by said control unit, and
    said measurement unit measures a quantity of movement of the projected light spot on the basis of the first and second images picked up by said image pickup unit.

3. The measurement apparatus according to claim 1, wherein said image pickup unit picks up an image of a trajectory of the projected light spot while the inclination of said mirror plane is changed by said control unit, and
    said measurement unit measures a quantity of movement of the projected light spot on the basis of the image of the trajectory picked up by said image pickup unit.

4. The measurement apparatus according to claim 1, further comprising an extraction unit for extracting the projected light spot, which is an object of measurement, from a plurality of light spots projected on said projection unit on the basis of the image picked up by said image pickup unit.

5. The measurement apparatus according to claim 4, wherein said extraction unit extracts the projected light spot, which is the object of measurement, on the basis of intensities of the light spots.

6. The measurement apparatus according to claim 4, wherein said extraction unit extracts the projected light spot, which is an object of measurement, on the basis of sizes of the light spots.

7. The measurement apparatus according to claim 4, wherein said extraction unit extracts the projected light spot, which is an object of measurement, on the basis of arrangement positions of the light spots.

8. The measurement apparatus according to claim 4, wherein said extraction unit extracts the projected light spot, which is an object of measurement, on the basis of a difference in coordinate value between the light spots before and after the change of the inclination of said mirror plane by said control unit.

9. The measurement apparatus according to claim 4, wherein said mirror system includes a plurality of rotary shafts so that said mirror plane is rotatable around each of said plurality of rotary shafts and,
    when a plurality of light spots projected on said projection unit are displayed in a state arranged on one line in said projection unit, said control unit rotates one rotary shaft in said mirror system so as to make a deflection angle of said mirror plane so that the projected light spot which is the object of measurement and the light spot other than the object of measurement are displayed on different lines and, in this state, controls the deflection angle of said mirror plane by rotating the other rotary shaft in said mirror system.

10. A measurement method of measuring a characteristic of a mirror system having a mirror plane variable to arrange an inclination, comprising:
    an emission step of emitting measurement light onto the mirror plane;
    a projection step in which reflected light formed when the measurement light emitted in said emission step is reflected from said mirror plane is projected as a projected light spot onto a projection unit;
    an image pickup step of picking up an image of said projection unit on which the reflected light is projected as the projected light spot in said projection step;
    a control step of controlling the inclination of said mirror plane; and
    a measurement step of measuring a quantity of movement of the projected light spot, which moves according to a change of the inclination of said mirror plane controlled in said control step, on the basis of the image of said projection unit picked up in said image pickup step.

11. The measurement method according to claim 10, wherein, in said image pickup step, an image of the projected light spot before a change of the inclination of said mirror plane in said control step is first picked up as a first image and an image of the projected light spot after the change of the inclination of said mirror plane in said control step is then picked up as a second image, and in said measurement step, a quantity of movement of the projected light spot is measured on the basis of the first and second images picked up in said image pickup step.

12. The measurement method according to claim 10, wherein, in said image pickup step, an image of a trajectory of the projected light spot is picked up while the inclination of said mirror plane is changed in said control step, and in said measurement step, a quantity of movement of the projected light spot is measured on the basis of the trajectory picked up in said image pickup step.

13. The measurement method according to claim 10, further comprising an extraction step of extracting the projected light spot, which is an object of measurement, from a plurality of light spots projected on said projection unit in said projection step on the basis of the image picked up in said image pickup step.

14. The measurement method according to claim 13, wherein, in said extraction step, the projected light spot which is the object of measurement is extracted on the basis of intensities of the light spots.

15. The measurement method according to claim 13, wherein, in said extraction step, the projected light spot which is the object of measurement is extracted on the basis of sizes of the light spots.

16. The measurement method according to claim 13, wherein, in said extraction step, the projected light spot which is an object of measurement is extracted on the basis of arrangement positions of the light spots.

17. The measurement method according to claim 13, wherein, in said extraction step, the projected light spot which is an object of measurement is extracted on the basis of a difference in coordinate value between the light spots before and after the change of the inclination of said mirror plane in said control step.

18. The measurement method according to claim 13, wherein said mirror system includes a plurality of rotary shafts so that said mirror plane is rotatable around each of said plurality of rotary shafts and, in said control step, when a plurality of light spots projected in said projection step are displayed in a state arranged on one line in said projection unit, one rotary shaft in said mirror system is rotated so as to make a deflection angle of the mirror plane so that the projected light spot which is the object of measurement and the light spot other than the object of measurement are displayed on different lines and the deflection angle of said mirror plane is then controlled by rotating the other rotary shaft in said mirror system.

19. A mirror system manufacturing method of manufacturing a mirror system having a mirror plane variable to arrange an inclination, comprising:

a manufacturing step of manufacturing said mirror system; and an inspection step of inspecting said mirror system manufactured in said manufacturing step, said inspection step including:

an emission step of emitting measurement light onto the mirror plane;

a projection step in which reflected light formed when the measurement light emitted in said emission step is reflected from said mirror plane is projected as a projected light spot onto a projection unit;

an image pickup step of picking up an image of said projection unit on which the reflected light is projected as the projected light spot in said projection step;

a control step of controlling the inclination of said mirror plane; and a measurement step of measuring a quantity of movement of the projected light spot, which moves according to a change of the inclination of said mirror plane controlled in said control step, on the basis of the image of said projection unit picked up in said image pickup step.

* * * * *